United States Patent
Edgar et al.

(10) Patent No.: US 8,786,897 B2
(45) Date of Patent: *Jul. 22, 2014

(54) IMAGE CAPTURE UNIT AND COMPUTER READABLE MEDIUM USED IN COMBINATION WITH SAME

(71) Applicant: Image Trends, Inc., Austin, TX (US)

(72) Inventors: Albert Durr Edgar, Austin, TX (US); Michael Charles Wilder, Austin, TX (US); Darryl Ray Polk, Austin, TX (US); Michael David Wilkes, Austin, TX (US); Sheppard Parker, Austin, TX (US); Martin Potucek, Austin, TX (US)

(73) Assignee: Image Trends IP, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,254

(22) Filed: Sep. 20, 2013

(65) Prior Publication Data

US 2014/0022595 A1    Jan. 23, 2014

Related U.S. Application Data

(60) Division of application No. 13/749,556, filed on Jan. 24, 2013, now Pat. No. 8,570,588, which is a continuation of application No. 12/590,725, filed on Nov. 13, 2009, now Pat. No. 8,384,947.

(60) Provisional application No. 61/199,467, filed on Nov. 17, 2008.

(51) Int. Cl.
*H04N 1/00* (2006.01)
*G06K 9/22* (2006.01)
*G06K 9/00* (2006.01)
*H04N 1/387* (2006.01)
*H04N 1/04* (2006.01)
*H04N 1/107* (2006.01)

(52) U.S. Cl.
CPC ............... *H04N 1/3876* (2013.01); *H04N 1/04* (2013.01); *H04N 1/00408* (2013.01); *G06K 9/228* (2013.01); *G06K 9/00483* (2013.01); *H04N 1/107* (2013.01); *H04N 1/0044* (2013.01)
USPC .............. 358/1.6; 358/1.5; 358/474; 358/505

(58) Field of Classification Search
None
See application file for complete search history.

(56) References Cited

U.S. PATENT DOCUMENTS 5,355,146 A * 10/1994 Chiu et al. .................... 345/156
8,189,965 B2 * 5/2012 Edgar et al. .................. 382/313

* cited by examiner

*Primary Examiner* — Dov Popovici
(74) *Attorney, Agent, or Firm* — David O. Simmons

(57) ABSTRACT

An image capture unit and computer readable medium used in combination therewith is disclosed. In a preferred embodiment, the image capture unit includes an image capturing sensor, a visual display, an instance of the computer readable medium, and circuitry for integrating functionalities thereof. The computer readable medium causes sensor data received from the image capturing sensor to be processed. The sensor data includes a plurality of image tiles and position indicating data defining a respective relative position of each one of each image tiles. Each one of each image tiles includes data representing a discrete portion of visual content. The computer readable medium causes a feedback image be displayed on the visual display. Displaying the feedback image includes correlate the relative position of each one of each image tiles with at least one other image tile that has been previously generated and displayed.

13 Claims, 13 Drawing Sheets

IMAGE CAPTURE UNIT AND COMPUTER READABLE MEDIUM USED IN COMBINATION WITH SAME

CROSS REFERENCE TO RELATED APPLICATIONS

This divisional patent application claims priority from U.S. Non-provisional patent application Ser. No. 13/749,556, filed 24 Jan. 2013, entitled "IMAGE CAPTURE UNIT AND COMPUTER READABLE MEDIUM USED IN COMBINATION WITH SAME", now U.S. Pat. No. 8,570.588 issued on 29 Oct. 2013, which claims priority from continuation patent application claims priority from U.S. Non-provisional patent application Ser. No. 12/590,725, filed 13 Nov. 2009, entitled "HANDHELD SCANNER AND SYSTEM COMPRISING SAME" now U.S. Pat. No. 8,384,947 issued on 26 Feb. 2013, which claims priority from U.S. Provisional patent application having Ser. No. 61/199,467, filed 17 Nov. 2008, entitled "HANDHELD SCANNER AND METHOD", both having a common applicant herewith and being incorporated herein in their entirety by reference.

FIELD OF THE DISCLOSURE

This invention generally relates to digital scanners and other types of image capture units and more specifically to a handheld image capture unit.

BACKGROUND

Document and image scanners are pervasive in the modern digital world. They are used to digitize documents and images (e.g., pictures) so that they can be used electronically. One of the most common types of scanner is the fax machine. A physical document such as, for example, a typed document or picture, is fed into the scanner where it is automatically moved across a sensor to digitize visual content (e.g., printed text, illustrations, photo, etc) provided on the surface of the physical document, thereby creating a digitized image of the visual content. The digitized visual content image is then sent over a communication network to another fax machines that prints a representation of the digitized visual content image. A physical document is one example of a scannable object.

Another common type of scanner is the flatbed scanner, which is typically connected to a computer. A physical document is placed onto a glass imaging surface (commonly referred to as a platen) of the flatbed scanner and, once activated, the flatbed scanner automatically scans the visual content of the physical document, thereby creating a digitized image of the visual content. The digitized visual content image can then be sent the computer for allowing a user to view and/or use the digitized visual content image for any one of a number of purposes. Examples of such purposes include, but are not limited to, printing the digitized visual content image, editing the digitized visual content image, converting the digitized visual content image into an electronic text document using optical character recognition (OCR) software, inserting the digitized visual content image into an electronic document, and transmitting the digitized visual content image over a network.

The operation of such scanners generates captured image data (also referred to as image sensing data) and position indicating data (also referred to as position sensor data). The captured image data represents an image of visual content of a scanned object (e.g., a physical document) physical document that is captured by an image sensor of the scanner. The position indicating data corresponds to a relative position of the scanner when a corresponding portion of the captured image data captured. Combined, the captured image data and the position indicating data allow a complete digitized visual content image to be constructed. Scanners generally require a close tolerance between the captured image data and the position indicating data to accurately construct the digitized visual content image. The more accurate the position and sensor data, the better the image produced by the scanner. Likewise, without accurate position indicating data, the image can be blurred or smeared. However, because conventional scanners generally use mechanical systems to accurately secure and/or position physical documents relative to the position sensor and/or image sensor, their ability to maintain close tolerance between the sensor data and the position indicating data, thus adversely impacting image quality.

Various implementations of handheld scanners have been attempted. But, they have not been commercially or functionally successful. In operation, these conventional handheld scanners take a series of images as a user moves the scanner across a physical document. The series of images are then assembled into the final image based on position indicating data of each capture image.

A key drawback with most conventional handheld scanners is that the scanned image is of poor quality. There are many factors that, cumulatively, can cause poor image quality, of which a few are described here. One problem with most conventional handheld scanners is that the user has no way of knowing if they have completely scanned an entire area of the scanned object until the final image is viewed. If the user has not scanned a portion of the scanned object during the scanning process, the user must rescan the scanned object again with no re-assurance that they will not inadvertently scan a different portion of the scanned image, thus resulting in a poor user experience. Another problem with most conventional handheld scanners is that the position indicating data typically becomes more inaccurate as the errors in the position indicating data accumulate with the number of scanned tiles, thus resulting in an inaccurate image with blurring and other errors. Other errors in the scanned image can come from scratches in the camera lens, poor assembly of the individual tiles, and/or low image processing speed, which can all result in poor quality scanned images and/or a poor user experience.

SUMMARY OF THE DISCLOSURE

The present invention comprises a handheld scanner system and method. A handheld scanner system configured in accordance with the present invention operates to digitize an area of a scannable object (e.g., a document). The handheld scanner system can comprise a scanner and a scanner software application. The scanner can include a body having an upper surface and a lower surface, a positioning system and an imaging system. The imaging system can include a lighting subsystem and an image sensor subsystem.

The imaging system operates to digitize areas of the scannable object as the scanner is moved across the scannable object. In particular, the lighting subsystem illuminate at least a portion of the scannable object and the image sensor subsystem digitizes at least a portion of the scannable object illuminated by the lighting subsystem. The image sensor system then computes and outputs captured image data.

The positioning system operates to detect the relative position and/or movement of the scanner as it moves across the scannable object. The positioning system outputs the position indicating data corresponding to a position and orientation of the handheld scanner with respect to the image being scanned. The position indicating data is correlated with the captured image data.

The scanner software application receives the position indicating data and captured image data and constructs a feedback image and output image. The feedback image enables a user to view the areas of the scannable object that have been digitized and can also highlight the areas of the scannable object that have not been digitized. The result of the scanning process is an output image having higher quality and resolution than conventional handheld scanners.

Certain embodiments can have all, some or none of the following advantages. One advantage of at least one embodiment is that the negative effects of defects in the images are reduced. Another advantage of at least one embodiment is that image detail is increased. A further advantage is that the images are more aesthetically pleasing.

In one embodiment of the present invention, a scanner comprises a position indicating system, an imaging system, and a data processing arrangement. The position indicating system is configured for generating position indicating data instances. The position indicating data instances each includes data derived from translational movement of the scanner within a reference plane and from rotational movement of the scanner about a rotational axis extending through the reference plane. The imaging system is configured for capturing an image of visual content of a scannable object on which the scanner is being moved. The data processing arrangement is configured for deriving from at least one of the position indicating data instances a position of the scanner at a point in time when the image capturing was one of initiated, completed, and partially completed.

In another embodiment of the present invention, a scanner comprises a housing having a first surface configured for being engaged by a hand of a user and a second surface configured for slideably supporting the housing on a surface of a scannable object. The scanner further comprises means coupled to the housing for sensing translational movement of the housing, means coupled to the housing for sensing rotational movement of the housing, and means coupled to the housing for capturing an image of visual content on the surface of the scannable object.

In another embodiment of the present invention, a scanner system comprises at least one processor, memory coupled to the at least processor, and instructions accessible from the memory by the at least one processor. The instructions are configured for causing the at least one processor to generate a plurality of position indicating data instances along a first timeline interval. The position indicating data instances each corresponds to a position of a scanner at a respective position along a path of movement of the scanner. The instructions are configured for causing the at least one processor to generate a captured image data instance along a second timeline interval longer than the first timeline interval. The captured image data is captured from visual content on a surface on which the scanner is supported and moved. The instructions are configured for causing the at least one processor to use at least two of the position indicating data instances for interpolating a position of the scanner when generation of the captured image data instance was one of initiated, completed, and partially completed.

In another embodiment of the present invention, a computer-readable medium has computer-executable instructions accessible therefrom. The computer-executable instructions are configured for controlling at least processor to perform a method of processing sensor data generated by an image scanner. The method can comprise the operations of receiving position indicating data instances each one of the position indicating data instances includes data derived from translational movement of the scanner within a reference plane and from rotational movement of the scanner about a rotational axis extending through the reference plane, receiving an image of visual content of a scannable object on which the scanner is being moved, and deriving from at least a portion of the position indicating data instances a position of the scanner at a point in time when the image capturing was one of initiated, completed, and partially completed.

In another embodiment of the preset invention, a scanner system operable to be used by a user to digitize an area of a scannable object comprises a handheld scanner and a software application. The handheld scanner comprises a positioning system and an imaging system. The positioning system is configured for detecting a planar position of the handheld scanner and a rotational orientation of the scanner at the planar position and for outputting a plurality of position indicating data instances derived from the planar position of the handheld scanner and the rotational orientation of the handheld scanner. The imaging system is configured for illuminating a portion of the scannable object and for digitizing at least a portion of the scannable object illuminated thereby to generate a plurality captured image data instances. The software application is configured for receiving, from the handheld scanner, the position indicating data instances and the captured image data instances, for constructing a feedback image using the position indicating data instances and the captured image data instances, and for constructing an output image using the position indicating data instances and the captured image data instances. The feedback image is constructed in a real-time manner or near real-time manner as the user moves the handheld scanner across the scannable object. The output image has a resolution at least equal to a resolution of the feedback image.

Other technical advantages will be readily apparent to one skilled in the art from the following figures, descriptions, and claims.

BRIEF DESCRIPTION OF THE DRAWINGS

For a more complete understanding of the embodiments of the present invention and the advantages thereof, reference is now made to the following description taken in conjunction with the accompanying drawings, wherein like reference numerals represent like parts, in which.

DETAILED DESCRIPTION OF THE DRAWING FIGURES

FIGS. 1 through 16 illustrate various aspects of a handheld scanner system and method configured in accordance with an embodiment of the present invention. The present invention is illustrated in terms of a computer mouse having a scanner integral therewith. It should be understood that the present invention can comprise other embodiments without departing from the spirit and scope of this invention. For example, the present invention can be incorporated into a standalone hand scanner or other suitable type of scanner systems.

Figure 1:
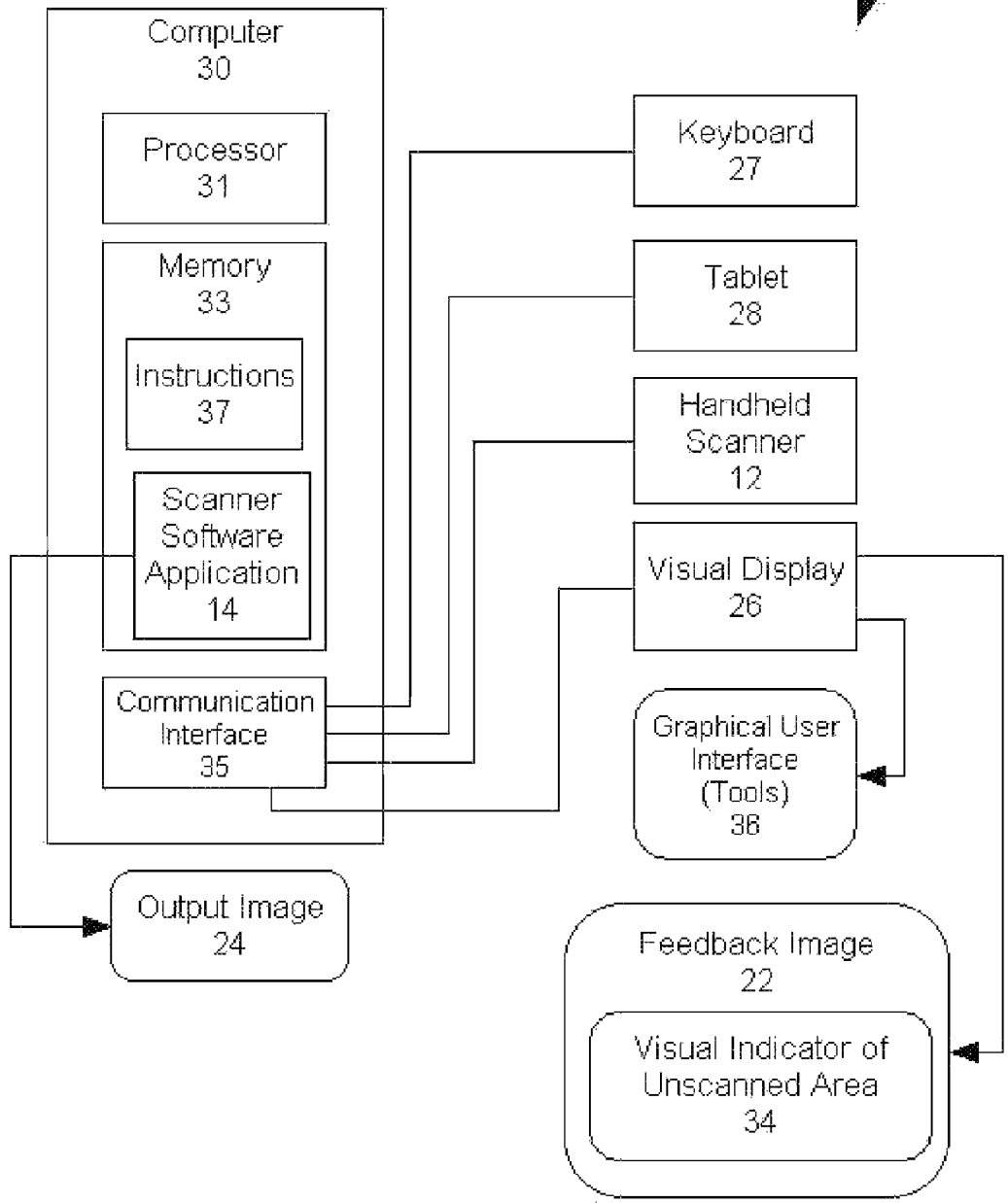
FIG. 1 is a schematic view of a handheld scanner system in accordance with an embodiment of the present invention.

FIG. 1 is a schematic view of a handheld scanner system 10 in accordance with an embodiment of the present invention. In the depicted embodiment, the handheld scanner system 10 comprises a scanner 12 and a scanner software application 14. Preferably, but not necessarily, the scanner 12 is a manually-movable (e.g., handheld) scanner.

Figure 2:
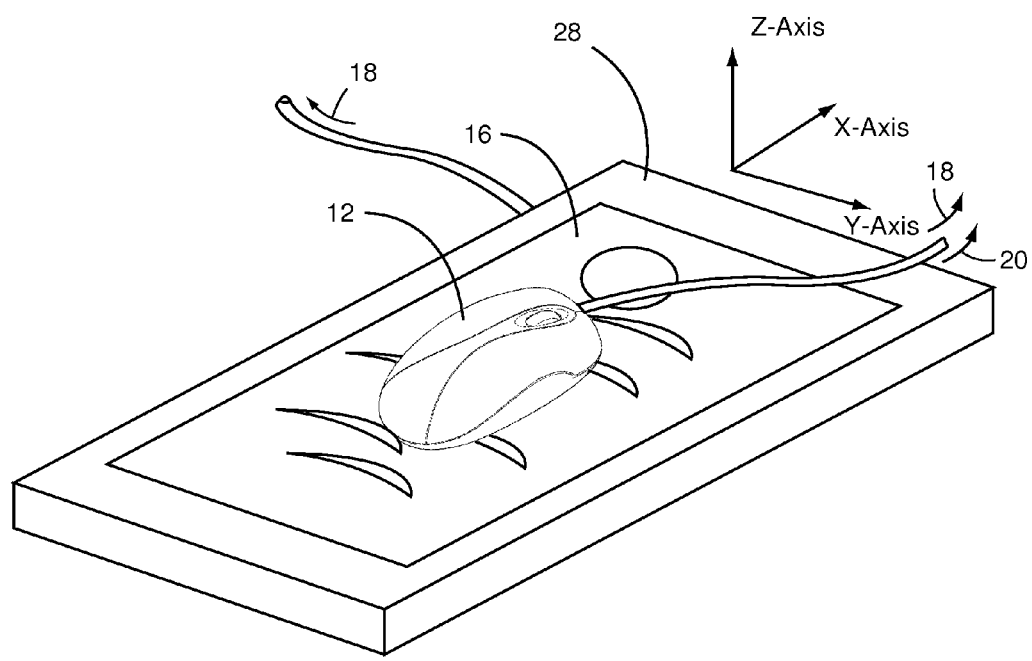
FIG. 2 is perspective view of a handheld scanner and tablet in accordance with an embodiment of the present invention.

Referring now to FIGS. 1 and 2, the scanner 12 operates to digitize visual content of a scannable object 16 and output position indicating data PID and captured image data CID to the scanner software application 14. It is disclosed herein that sensor data configured in accordance with the present invention can include the position indicating data PID and the captured image data. Examples of the scannable object 16 include, but are not limited to, a textual document, a photograph, a map, an illustration, a 3-dimensional object having scannable indicia provided thereon, and other structures having visual content provided thereon. The position indicating data PID includes translational position indicating data within an X-Y plane and includes rotational position indicating data of the scanner 12 about a Z-axis, as shown in FIG. 2. Thus, the term position indicating data as used herein refers to translational and rotational information that defines movement of a scanner. The captured image data CID includes data comprising an image captured by the scanner 12.

Preferably, the position indicating data PID and the captured image data CID each include respective information allowing a given portion of the captured image data CID to be synchronized with (e.g., correlated to) a corresponding portion of the position indicating data for the purpose of correlating relative position of discrete digitized images generated by the scanner 12. For example, in one embodiment of the present invention, the captured image data CID of a sensor data instance includes a plurality of discrete digitized image of the scannable object 16 and the position indicating data PID includes a plurality of discrete scanner position (e.g., x-y-z axes coordinates) correspond to a position of the scanner when the captured image data is generated. As will be described below in greater detail, processing a digitized image by the scanner software application 14 can include correlating a relative position of the digitized image with other corresponding digitized images. To this end, time stamping of position indicating data PID and time stamping of captured image data is one embodiment of the position indicating data PID and the captured image data CID each including respective information allowing the captured image data CID to be synchronized with (e.g., correlated to) corresponding position indicating data for the purpose of correlating relative position of digitized images generated by the scanner 12.

The scanner software application 14 operates to receive the position indicating data PID and the captured image data CID from the scanner 12 and construct a feedback image 22 and an output image 24. The feedback image 22 is displayed on visual display 26 and allows the user to view the movement of the scanner 12 across the scannable object 16 and determine which areas of the scannable object 16 have been scanned and which areas of the scannable object 16 have not been scanned. The output image 24 can be displayed, printed, stored or electronically communicated.

The configuration of the handheld scanner system 10 often depends on the type of scannable object 16 to be digitized. In the depicted embodiment, the handheld scanner system 10 is a mouse scanner system, wherein the scanner 12 is implemented as a computer mouse scanner and the scanner software application 14 operates on a computer 30. A keyboard 27 can be coupled to the computer 30 for manually entering information using keystrokes. In another embodiment, the handheld scanner system 10 comprises a standalone unit where the scanner 12, the scanner software application 14, and the display 26 are integrated together into a single portable device.

As shown in FIGS. 1 and 2, the handheld scanner system 10 can also includes a tablet 28. The tablet 28 can operate in conjunction with the scanner 12 to determine the position of the scanner 12. Accordingly, it is disclosed herein that the position indicating data PID can be output by the scanner 12, the tablet 28, or both the scanner 12 and the tablet 28.

The scanner software application 14 can comprise any suitable computer readable instructions operable to receive the position indicating data PID and captured image data CID and to construct the feedback image 22 and output image 24. The feedback image 22 preferably includes a pan area (e.g., viewable area) that automatically changes its displayed boundaries based on the position of the scanner 12. The displayed boundaries to be scanned are generally defined by the maximum and minimum positions of the scanner 12 with the X-Y plane. The feedback image 22 also preferably includes visual indicators 34 that show the areas of the scannable object 16 within the boundaries that have not been scanned by scanner 12. For example, the visual indicators 34 are shown in relative position to portions of the visual content of the scannable object 16 that has already been scanned. As unscanned portions of the visual content of the scannable object 16 are scanned, the visual indicators 34 are replaced by the representation of the scanned visual content of the scannable object 16.

The visual indicators 34 can include color highlights and variations in intensity to call the users attention to potential areas that need to be scanned. In one embodiment, the visual indicators 34 can include a pattern of colors, pattern of shapes, particular color or other highly recognizable indicator to highlight areas that have not been digitized. The visual indicators 34 can also comprise high intensity colors, like red, that highlight areas that have not been scanned by scanner 12. Furthermore, the visual indicators 34 can include drop shadows. It is disclosed herein that the present invention is not unnecessarily limited to any particular configuration of such visual indicators.

The scanner software application 14 can also include tools 36 (e.g., via a graphical user interface) for modifying the feedback image 22 and output image 24. The tools 36 will generally include color/contrast editing, image resize, image rotation, storing and image clearing functions, to name a few. The tools 36 will also preferably include settings that allow the user to select the type of visual indicators 34 to be used on the feedback image 22. It is disclosed herein that the scanner software application 14 can include other suitable functions and processes.

The visual display 26 can comprise any suitable device operable to display the feedback image 22 to the user. In the depicted embodiment, as illustrated, the visual display 26 is a computer monitor. In other embodiments, such as used in a standalone unit, the visual display 26 can comprise a liquid crystal display or such other suitable display technology.

The computer 30 includes a processor 31, memory 33 and a communication interface 35. Instructions 37 within the memory 33 are accessible by the processor 31 for allowing the processor 31 to carry out functionality of the computer 30. One example of such computer functionality is running the scanner software application 14. The scanner software application 14 can reside within the memory 33 or within a different storage device of the computer 30 and/or accessible by the processor 31. In one embodiment, the scanner 12, the visual display 6, the keyboard 27 and the tablet 28 are coupled to the computer via the communication interface 31. A Universal Serial Bus (USB) port and or a USB hub are examples of the communication interface 31.

Figure 3:
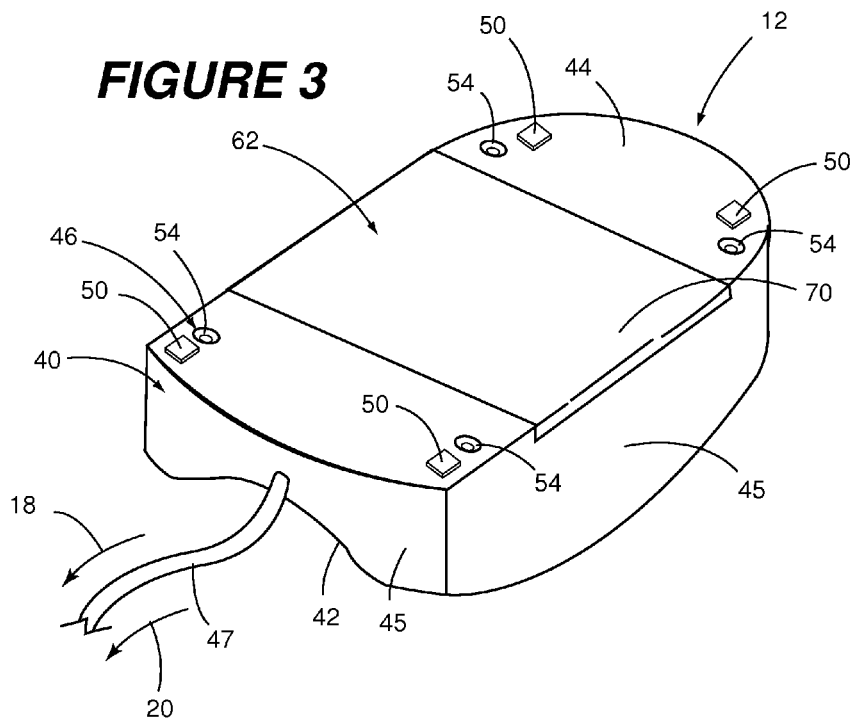
FIG. 3 is a bottom perspective view of a handheld scanner in accordance with the present invention.
Figure 4:
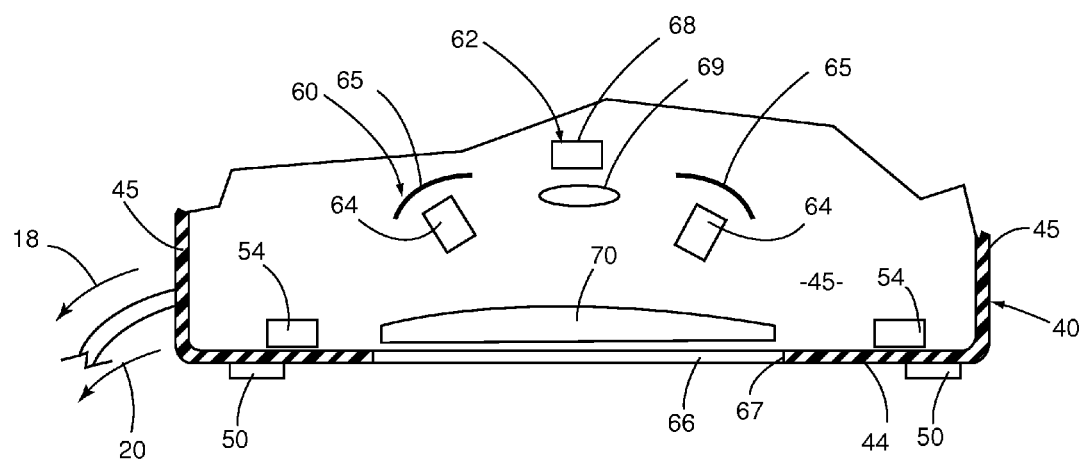
FIG. 4 is fragmentary view showing the interior space of the handheld scanner shown in FIG. 3 and showing spatial relationship of image system components within such interior space.
Figure 5:
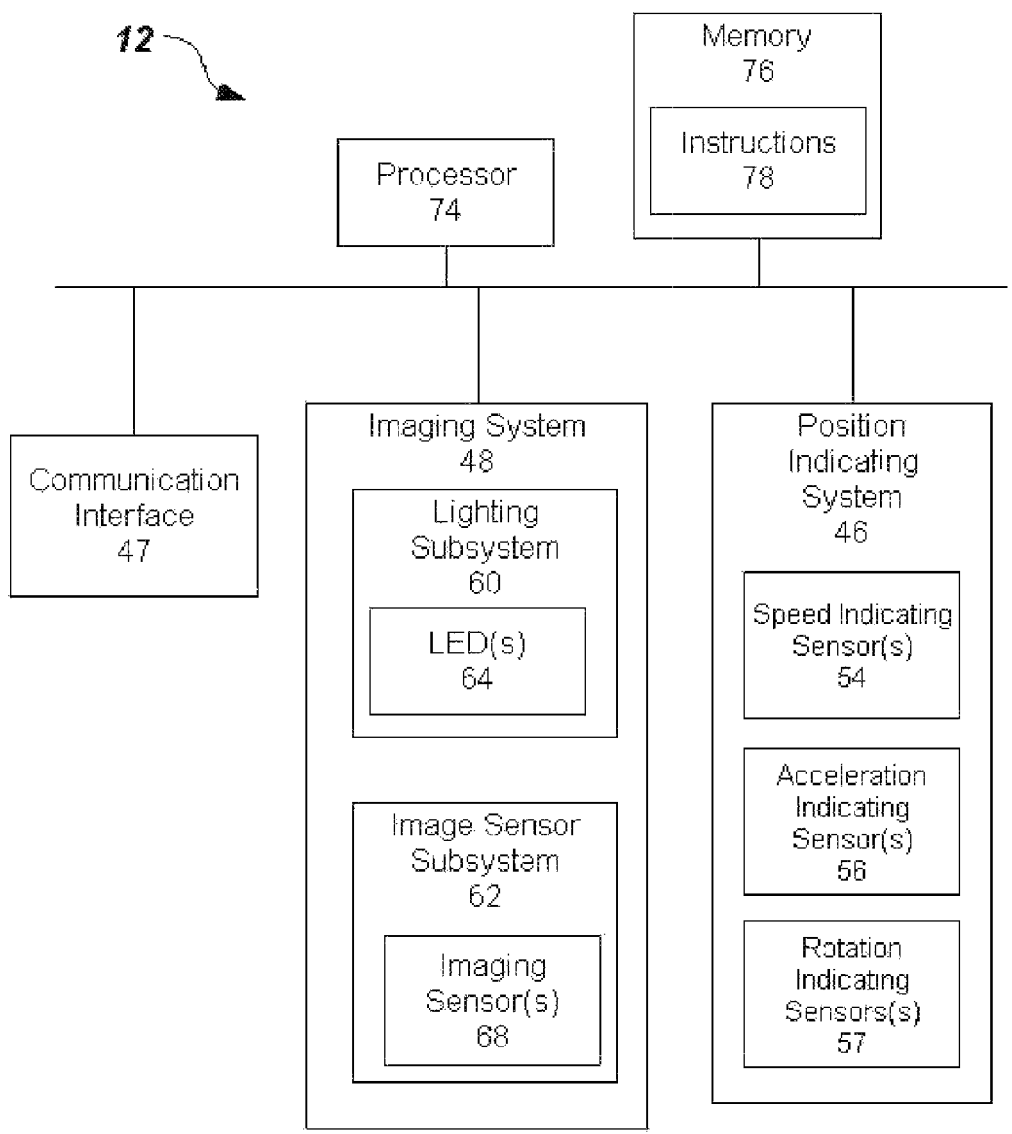
FIG. 5 is a schematic view of the handheld scanner of FIG. 3.

Referring now to FIGS. 3-5, the scanner 12 is shown configured in accordance with a preferred embodiment of the present invention. In this embodiment, the scanner 12 comprises a body 40 having an upper surface 42, a lower surface 44 and edge faces 45. As denoted in FIG. 5, the scanner 12 includes a positioning system 46 configured for outputting position indicating data PID and an imaging system 48 configured for outputting the captured image data CID.

Still referring to FIGS. 3-5, the body 40 can have any suitable size or shape that enables the user to hold the scanner 12 in their hand and scan a scannable object (e.g., the scannable object 16). The body 40 can also include low-friction members 50 (or a one-piece shield) mounted on the lower surface 44 and that are configured to enhance sliding of the body 40 across the scannable object 16 with uniform movement. Thus, the lower surface 44 is one embodiment of a support surface of the scanner 12. Although not specifically shown, the body 40 can also include a skin or other suitable structure that covers a portion of the lower surface 44 for helping to protect components of the position indicating system 46 and/or the imaging system 48 from damage, contamination, and the like.

In the depicted embodiment, the scanner 12 includes a communication interface 47 that provides for allowing communication of the position indicating data PID and the captured image data CID to the scanner software application 14 operating on the computer 30. To this end, the communication interface 47 is coupled (e.g., in a wired or wireless manner) to the communication interface 35 of the computer 30. Preferably, the communication interface 35 of the computer 30 and the communication interface 47 of the scanner 12 jointly provide for sufficient bandwidth to allowing transmission of the position indicating data PID and captured image data CID data from the scanner 12 to the computer 30 at a real-time or near real-time data rate.

The positioning system 46 can comprise any suitable device or system for determining the relative position of the scanner 12 with respect to a scannable object being scanned. In the depicted embodiment, the positioning system 46 includes a plurality of speed indicating sensors 54 that enable relative movement of the scanner 12 within the X-Y plane (shown in FIG. 2) to be determined. The speed indicating sensors 54 are further configured (e.g., physically positioned) in a manner for allowing relative motion of the scanner 12 around the Z-axis (shown in FIG. 1) to be determined. As such, interferometers (i.e., optical sensors) are examples of the speed indicating sensors. The speed indicating sensors 54 are preferably located near the edges 45 on the lower surface 44 of the body 40. Locating the speed indicating sensors 54 near one or more edges 45 helps detect when a portion of the imaging system 48 moves beyond the scannable object 16.

The positioning system 46 can also include at least one acceleration indicating sensor 56 configured for enabling a rate of change in speed of the scanner 12 during movement thereof to be determined, at least one rotation indicating sensor 57 configured for enabling a rotational orientation of the scanner 12 to be determined, or both. The inclusion of the acceleration indicating sensor 56 and/or the rotation indicating sensor 57 can increase the accuracy and/or degree of resolution of the position indicating data. A sensor that senses acceleration and/or change in acceleration (e.g., an accelerometer) is referred to herein as an acceleration indicating sensor. A gyroscopic sensor is an example of a rotation indicating sensor that is capable of sensing rotation of the scanner 12. Thus, position indicating data in accordance with the present invention can include discrete data from each sensor of a positioning system, composite position indicating data derived from at least a portion of the sensors, or both. For example, in one embodiment, position indicating data includes discrete data from a plurality of interferometers.

The scanner 12 is preferably further configured to detect when the scanner 12 is lifted from the scannable object 16 or when all or a portion of the optical sensors 54 are off the scannable object 16. Although the positioning system 46 is described in terms of aforementioned sensors, the positioning system can comprise other suitable sensors without departing from the scope and spirit of the present invention. It is disclosed herein that the scanner can include only speed indicating sensors 54 when the speed indicating sensors 54 are suitably configured for providing the position indication data PID. For example, when the optical sensors 54 are interferometer sensors having suitable operating characteristics (e.g., each including an integrated lighting source and velocity sensor) and performance, such interferometers can suitably provide the position indicating data PID. Preferably, the sensor or sensors of the position indicating system provide a suitable degree of accuracy in the position indicating data over a suitable range of speeds over which the scanner 12 is typically moved.

The imaging system 48 can comprise any suitable device or system for digitizing an area of a scannable object having visual content thereon (e.g., the scannable object 16 shown in FIG. 2). In the depicted embodiment, the imaging system 48 comprises a lighting subsystem 60 and an image sensor subsystem 62. The lighting subsystem 60 operates to illuminate an area of a scannable object to be scanned and the image sensor subsystem 62 operates to digitize an area of the scannable object illuminated by the lighting subsystem 60 during illumination thereof by the lighting subsystem 60.

The lighting subsystem 60 can comprise any suitable illumination device. In the depicted embodiment, the lighting subsystem 60 comprises one or more light emitting diodes (LED) units 64 and, optionally, one or more light reflecting devices 65 (e.g., a mirror) associated with each one of the LED units 64. The LED units 64 and light reflective devices 65 are arranged and configured to project and/or reflect light through a cover glass 66, which can be a glass or polymeric material, and that is mounted within or over an opening 67 within the lower surface 44 of the body 40. In this manner, light from the lighting subsystem 60 can illuminate the portion of the scannable object to be scanned that is exposed within the opening 67. It is disclosed herein that a skilled person will appreciate that the lighting subsystem 60 can also include one or more other devices for enhancing the quality and intensity of light delivered from the lighting subsystem 60 to the scannable object being scanned. Examples of such other devices include, but are not limited to, a lens, a filter, or the like.

The LED units 64 are examples of suitable light sources configured for illuminating a scannable object being scanned. Optimally, the LED units 64 produce light (not limited to but including red, green, blue, and other colors of light), or such other suitable combination of light to produce red, green and blue captured image data CID. In one embodiment, the lighting subsystem 60 comprises a bar of white (or red, green and blue) LEDs 64. In another embodiment, the lighting subsystem 60 comprises multiple bars of LED units 64.

The operation of the lighting subsystem 60 can also be optimized through the manner in which the LED's 64 are configured and/or operated. In one embodiment, the LEDs 64 flash each one of a plurality of colors (e.g., reg, green, and blue) in series so that the image sensor subsystem 62 detects colors associated with each color of LED 64. In another embodiment, the image sensor subsystem 62 includes separate color detection sensors and the LEDs 64 flash all at once. In at least one embodiment, the lighting subsystem 60 can also comprise a white light illumination system.

The image sensor subsystem 62 can comprise any suitable image capture system. In the depicted embodiment, the image sensor subsystem 62 includes an image capturing sensor 68, a sensor lens 69 and a field lens 70. The field lens 70 is mounted on or adjacent to the cover glass 66. The image capturing sensor 68 is mounted at a distance above the field lens 70 with the sensor lens 69 located at a position between the image capturing sensor 68 and the field lens 70. Jointly, the configuration and relative positioning of the image capturing sensor 68, the sensor lens 69, and the field lens 70 cause light, which is being reflected from the scannable object being scanned through the cover glass 66, to be impinged onto a light receiving surface of the image capturing sensor 68. In this manner, the field of view of the image capturing sensor 68 can be approximately or entirely an area of the opening 67. While the image sensor subsystem 62 is shown as including only one image capturing sensor 68, it is disclosed herein that the image sensor subsystem 62 can include a plurality of sensors 68, thereby enhancing resolution of scanned visual content of a scannable object. In one embodiment, a lens arrangement in accordance with the preset invention includes the sensor lens 69 and the field lens 69.

It is disclosed herein that a skilled person will appreciate that the image sensor subsystem 62 can also include one or more other devices for enhancing the quality and intensity of light reflected from the scannable object being scanned to the image sensor subsystem 62. Examples of such other devices include, but are not limited to, a lens, a filter, or the like. Furthermore, in a preferred embodiment, at least one lens of the image sensor subsystem 62 is a telecentric lens, a polarized lens or a combination thereof.

In the depicted embodiment, the image capturing sensor 68 comprises an area array sensor that digitizes a small area of the scannable object being scanned. The resulting captured image data for a given sensor data instance is referred to herein as a tile. Each tile includes a digitized image of a respective portion of the scanned scannable object. Thus, the image sensor subsystem 62 functions as a digital camera that produces digitized segments (e.g., tiles) of an image being scanned. In another embodiment, the image capturing sensor 68 comprises a line array sensor that operates to digitize a line as the scanner 12 passes over the scannable object 16.

Preferably, the lighting subsystem 60, the image sensor subsystem 62, the opening 67, and the cover glass 66 are jointly configured for allowing the image sensor subsystem 62 to digitize an area of a scannable object at or near at least one edge 45 of the body 40. Such edge scanning functionality enables a complete page of a book, magazine and other such bound print materials to be scanned.

The scanner 12 preferably includes a processor 74 operable to receive the position indicating data PID and captured image data CID from the position indicating system 46 and the imaging system 48, respectively, pre-process such data, and then causes it to be transmitted to the scanner software application 14 running on the computer 30. To enable such transmission, it can be necessary to compress the data to minimize the bandwidth required for communicating the data to the scanner software application 14.

The scanner 12 can further include memory 76. Instructions 78, which determine operation of the communication interface 47, position indication system 46, and/or the imaging system 48, can be stored on the memory 76 and can be accessible therefrom by the processor 74. It is disclosed herein that the memory 76 can reside within the processor 74 or be configured in a standalone manner with respect to the processor 74. In at least one embodiment, the processor 74 can include memory having the instructions 78 to be stored thereon and/or, if the bandwidth is insufficient to communicate the data in real-time to the scanner software application 14, having position indicating data PID and/or captured image data CID buffered thereon. In one embodiment, the instructions 78, processor 74, and the memory 76 jointly define firmware of the scanner 12. However, it is disclosed herein that sensor data in accordance with the present invention can be generated and/or processed by any suitable data processing arrangement (e.g., including firmware, software, processors, memory, etc).

Functionality provided by the communication interface 47 includes enabling communication between the scanner 12 and the computer 30 (e.g., communicating position indicating data and captured image data from the scanner 12 to the computer 30). One key aspect of such communication interface functionality is that position indicating data and captured image data is preferably transmitted for reception by image processing software (e.g., scanner software application 14 discussed above in reference to FIG. 1) at a real-time or near real-time data rate with respect to generation of such data. Functionality of the position indicating system 46 includes generating position indicating data and functionality of the imaging system includes generating captured image data. The instructions 78 can be configured for providing all or a portion of such functionalities. In one embodiment, the sensor data configured in accordance with the present invention includes position indicating data, captured image data, time stamp information indicating when the position indicating data was generated, and time stamp information indicating when the captured image data was generated.

In view of the foregoing discussion, a skilled person will appreciate that the scanner 12 (e.g., through firmware thereof) is configured for providing sensor data capture functionality. In one embodiment, such sensor data capture functionality can be provided for by firmware of the scanner. More specifically, the firmware can provide for such image capture functionality through joint control of the imaging system 48 and the position indicating system 48. To this end, in operation of the scanner, the firmware performs an operation for sending out a trigger (e.g., a signal) for causing the LED(s) 64 of the lighting subsystem 60 to illuminate visual content of a scannable object upon which the scanner 12 is resting and correspondingly performs an operation for sending out a trigger for causing the position indicating system 46 to begin collecting position indicating data (e.g., scanner velocity information). Preferably, the triggers are outputted at a constant rate with respect to each other. In response to illumination of the LEDs, the firmware causes the image sensor(s) 68 of the image sensor subsystem 62 to start a time period where the image sensor(s) 68 collect photons emitted from the LED(s) 64 and reflected from the surface of the scannable object. At the end of the time period, captured image data from the image sensor(s) 68 is transferred to a first buffer internal to the scanner 12 (e.g., part of the memory 76 or a discrete first buffer device not shown). Associated position indicating data (e.g., interpolated position indicating data discussed below) from the position indicating system 46 along with other information associated with the position indicating data (e.g., time stamp information, scanner button state(s), lift bit indicating that a position indicating sensor is too far from the surface, etc) can be stored with the captured image data. While the first buffer is being updated with the current sensor data, sensor data within a second buffer internal to the scanner (e.g., part of the memory 76 or a discrete first buffer device not shown) is being transferred to an apparatus that provides image processing functionality (e.g., the computer 30). In one embodiment, sensor data is transferred from the first buffer to the second buffer in response to such sensor data of the first buffer being processed to a form required for performing image processing functionality in accordance with the present invention). However, other suitably configured data processing arrangements can be implemented for providing such sensor data capture functionality It is disclosed herein that the scanner 12 is configured in a manner allowing it to provide scanner functionality in accordance with the present invention and to also provide user input device functionality of a device commonly referred to as "a mouse". In one embodiment, the position indicating data PID generated by sensors of the position indicating system 46 is used for providing such mousing functionality.

Figure 6:
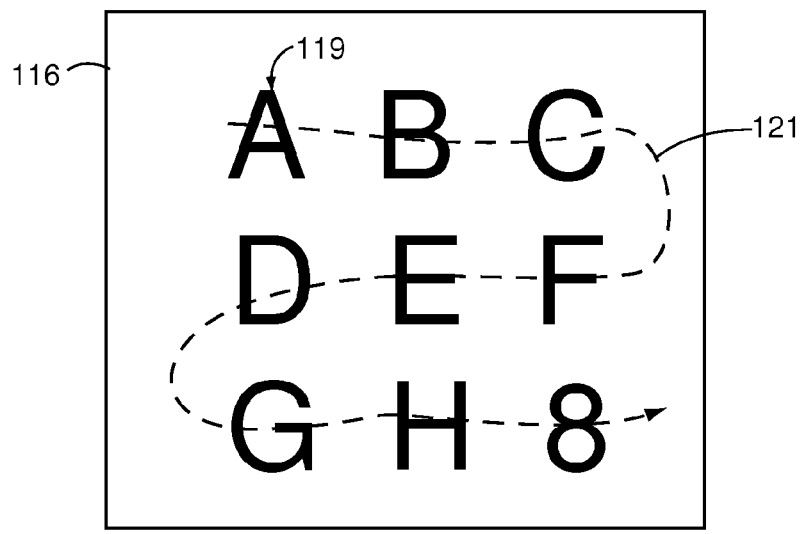
FIG. 6 is a diagrammatic view showing a scan path along visual content of a scannable object to be scanned using a scanner system configured in accordance with the present invention.
Figure 7:
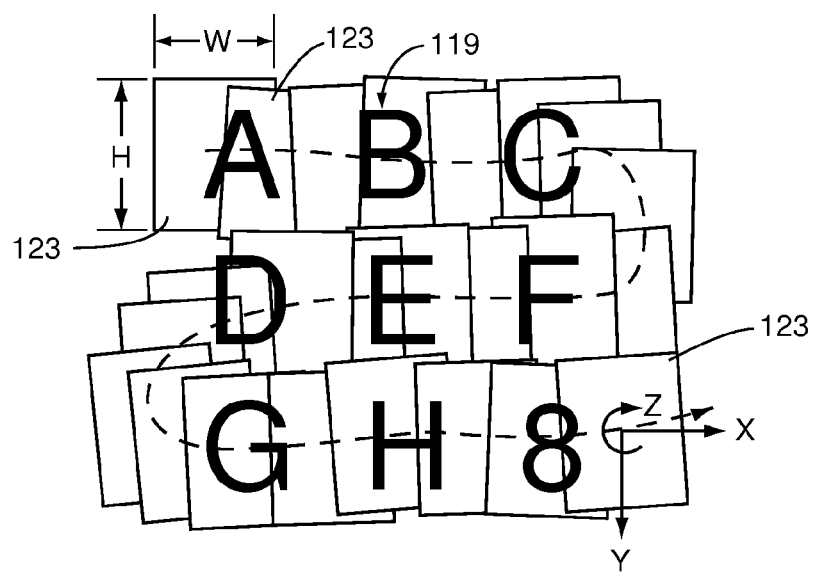
FIG. 7 is a diagrammatic view showing tiles generated over the scan path of the scannable object shown in FIG. 6.
Figure 8:
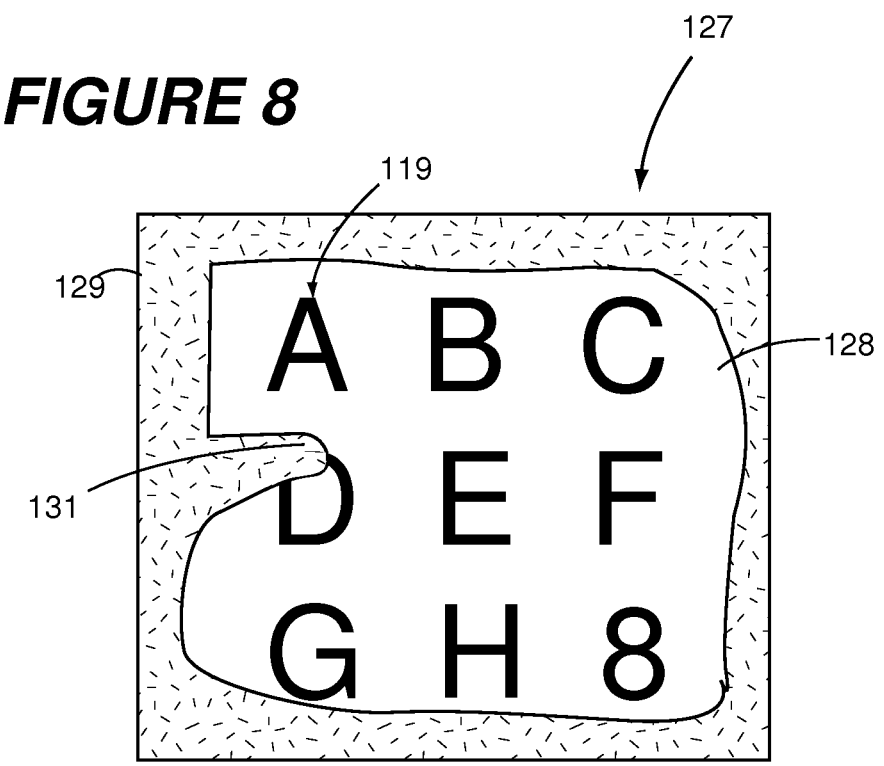
FIG. 8 is a diagrammatic view showing a feedback image in accordance with the present invention, which shows the tile generated along the scan path of the scannable object shown in FIG. 6.

Referring now to FIGS. 6-8, a relationship between position indicating data and captured image data is shown. As shown in FIG. 6, a scannable object (e.g., a document) has visual content 119 provided therein in the form of three lines of alphanumeric characters. A scan path 121 identifies a path over which a scanner configured in accordance with an embodiment of the present invention (e.g., the handheld scanner 12) traverses during scanning of the scannable object 116. FIG. 7 shows tiles 123 resulting from such scanning along the scan path 121. Each one of the tiles 123 represents an area imaged by the scanner at a respective point in time and, thus, includes a portion of the visual content 119 of the scannable object 119. Each one of the tiles 123 has a substantially common width W and height H corresponding to a discrete imaged area produced by the scanner. While each one of the tiles 123 is shown as being rectangular in shape, it is disclosed herein that each one of the tiles 123 can be a shape different than rectangular (e.g., round).

Each one of the tiles 123 has respective position indicating data and captured image data associated therewith. The position indicating data includes information designating a position of a particular one of the tiles 123 within an X-Y plane of the scannable object at the point in time when a respective one of the tiles 123 was created and includes information designating rotation about a Z-axis at the point in time when the respective one of the tiles 123 was created. The Z-axis extends perpendicular to the X-Y plane. In one embodiment, the position indicating data for each one of the tiles 123 includes a relative position of a particular one of the tiles 123 with respect to a location of a first one of the tiles 123. In another embodiment, the position indicating data for each one of the tiles 123 includes a relative position of a particular one of the tiles with respect to an immediately prior one of the tiles 123 (i.e., the image tile generated immediately prior to the particular one of the tiles). As such, each one of the tiles 123 can subsequently be positioned with respect to immediately adjacent ones of the tiles 123 to reconstruct the visual content 119 scanned from the scannable object 116.

The area of each tile 123 is approximately the same as a scan area of the scanner that creates each one of the tiles 123. Furthermore, as can be seen, the scan area of a scanner configured in accordance with the present invention is a fraction of the overall area of visual content of a scannable object being scanned with the scanner. As such, to capture all desired visual content of a scannable object, a scanner configured in accordance with the present invention requires that the scanner be moved about the scannable object until all of the desired visual content has been scanned. To assist a user in ensuring that all desired visual content has been scanned during a scanning session, embodiments of the present invention can include displaying a feedback image that depicts areas of a scannable object that have been scanned and those that have not.

FIG. 8 shows a feedback image 127 resulting from partial or incomplete scanning of the scannable object 116 during a scan session (i.e., a single contiguous scan path). As can be seen, the feedback image 127 shows portions of the visual content 119 that has been scanned (i.e., scanned area 128) and includes a visual indication 129 of unscanned portions of the visual content 119 (e.g., a shaded area or otherwise identifiable manner of denoting an unscanned area). In this manner, unscanned portions of the scannable object 116 that are unintentionally not yet scanned, but which are intended to be scanned, can be scanned during the scan session, thereby allowing a single scan process to capture all intended portions of the visual content 119. The visual indicator 129 allows unscanned areas of visual content 131 to be readily identified. During a scan session, reconstruction of the visual content 119 from the tiles 123 can be provided in a real-time or near real-time manner (e.g., based upon relatively low-resolution processing of the captured image data) for creating the feedback image 127 that shows the portions of the visual content 119 that has been scanned. It is disclosed herein that scanning over an already scanned portion of the visual content 119 during a scan session does not adversely impact such scanning or re-construction of the scanned image because unneeded captured image data from tiles can be omitted and/or deleted when creating a feedback image and/or output image.

Creating an image using position indicating data and captured image data in accordance with the present invention requires correlating each tile 123 (i.e., a discrete portions of captured image data) with a corresponding portion of the position indicating data. In doing so, a position in which the scanner captured a particular one of the tiles 123 can be determined. Knowing relative positions of the tiles enables the image to be created by stitching the tiles together in proper orientation and order. A feedback image (i.e., relatively low resolution) is one example of an image created using position indicating data and captured image data in accordance with the present invention. An output image (i.e., relatively high resolution) is another example of an image created using position indicating data and captured image data in accordance with the present invention.

Figure 9:
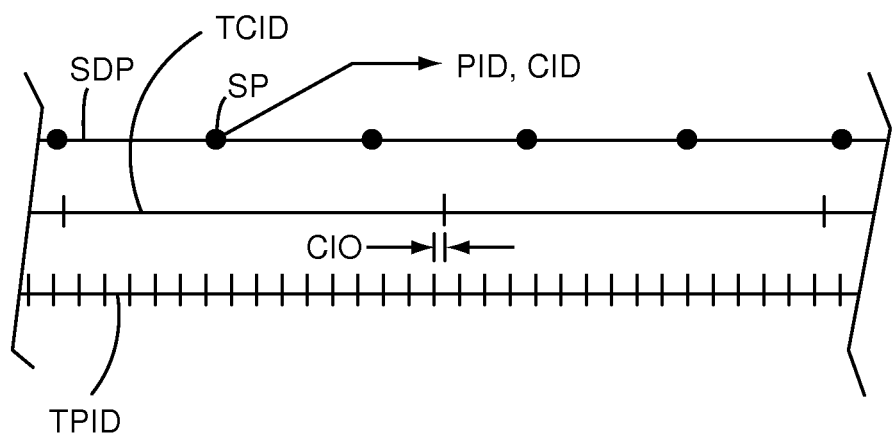
FIG. 9 is a diagrammatic view showing a chronological relationship between position indicating data and captured image data in accordance with an embodiment of the present invention.

Referring now to FIG. 9, relationship between position indicating data and captured image data is discussed in detail. As a scanner (e.g., scanner 12) is displaced along a displacement path (i.e., scanner displacement path SDP), the scanner generates position indicating data PID and captured image data CID at a plurality of scanner positions SP along the scanner displacement path SDP. The position indicating data PID is generated at a first frequency along a position indicating data timeline TPID and the captured image data CID is generated at a second frequency along a captured image data timeline TCID. In the depicted embodiment, the first frequency is greater than the second frequency, thus resulting in a greater amount of discrete position indicating data instances than discrete captured image data instances (i.e., tiles). It is disclosed herein that, in other embodiments, the first frequency and the second frequency can be substantially the same.

Each one of the hash lines on the position indicating data timeline TPID indicates a time at which generation of position indicating data PID is initiated for a corresponding position of the scanner 12 (i.e., discrete position indicating data instance) and each one of the hash lines on the captured image data timeline TCID indicates a time at which generation of captured image data CID is initiated for a corresponding position of the scanner 12 (i.e., discrete captured image data instance). Thus, position indicating data represents a relative position of the scanner when such position indicating data is initiated or generated and captured image data that represents an imaged area of visual content of a scanned object (i.e., a tile) when capture of an image corresponding to captured image data is initiated or generated by the scanner.

It is disclosed herein that, each data instance (i.e., position indicating data or captured image data) can include creation time information (e.g., a timestamp) that indicates relative time at which creation of the data instance was initiated. It is preferred for each one of the captured image data instance to be chronologically aligned with a respective position indicating data instance. In this manner, an exact position of the scanner when an image corresponding to a particular captured image data instance would be known or determinable. To this end, it is advantageous for discrete position indicating data instances and discrete captured image data instances to be transmitted for reception by image creation software (e.g., scanner software application 14 discussed above in reference to FIG. 1) at a real-time or near real-time data rate with respect to generation of such data instances.

However, in practice, a time at which a discrete captured image data instance is initiated will generally not be chronologically aligned with a time at which any one of the discrete position indication data instances is initiated. For example, as shown in FIG. 9, a time at which a captured image data instance is initiated at a particular scanner position SP is between two adjacent position indicating data instances. One reason for such asynchronous timing between the position indicating data PID and the captured image data CID is that the position indicating data PID can be generated at a higher frequency than the captured image data CID. Another reason is that, even if the data generation rates for the position indicating data PID and the captured image data CID was the same, maintaining data generation frequency for the position indicating data PID with a first timing device (e.g., a first clock) and maintaining data generation frequency for the captured image data CID with a second timing device (e.g., a second clock) can result in an chronological (i.e., timeline) offset between data generation timing for the position indicating data and captured image data. For example, as shown in FIG. 9, unless both clocks are started simultaneously, clocks running at the same clock rate or multiples thereof will be misaligned thereby creating a clock initialization offset CIO that is constant over time. As shown in FIG. 9, sensors that generate the position indicating data (e.g., a plurality of interferometers) operate at a frequency that is an even multiple of the frequency at which a sensor that generates the captured image data CID operates. Accordingly the clock initialization offset is constant.

In view of such asynchronous timing between position indicating data and captured image data, embodiments of the present invention can require that time-based computations be performed for accurately determining a position of the scanner when each discrete captured image data instance in captured. Such determination is also referred to herein as interpolation. The underlying objective of such computations is to approximate a relatively precise location of the scanner at the time the scanner captured an image corresponding to a particular discrete captured image data instance.

Figure 10A:
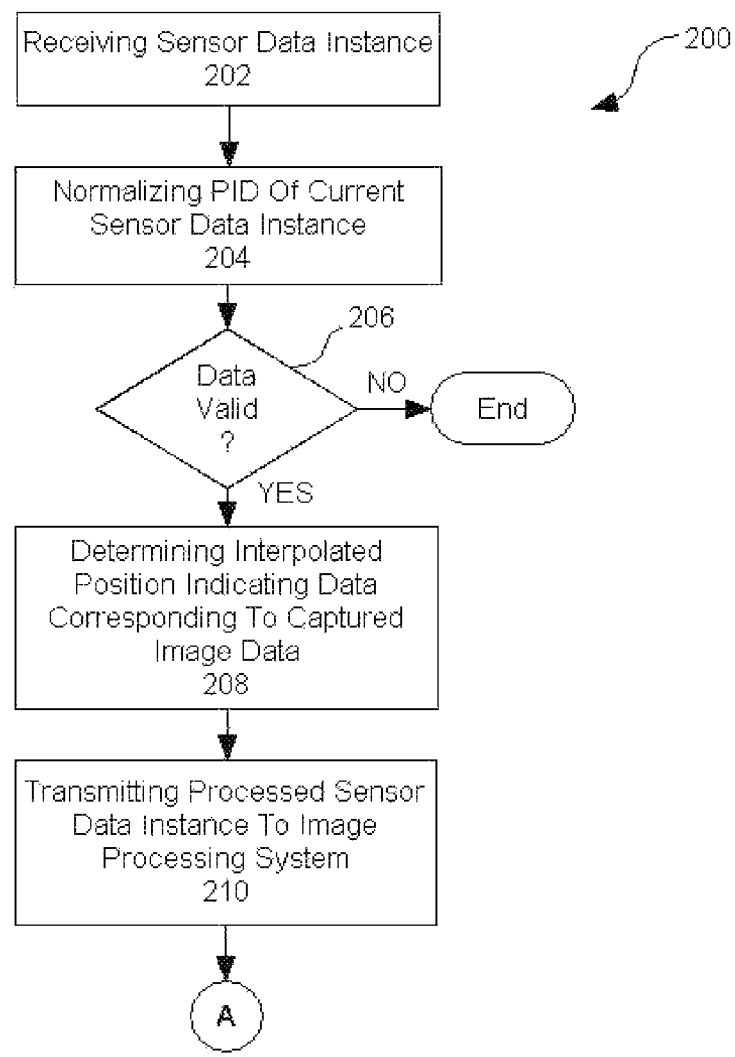
FIGS. 10A and 10B are flow diagrams showing a method for performing image processing functionality in accordance with an embodiment of the present invention.
Figure 10B:
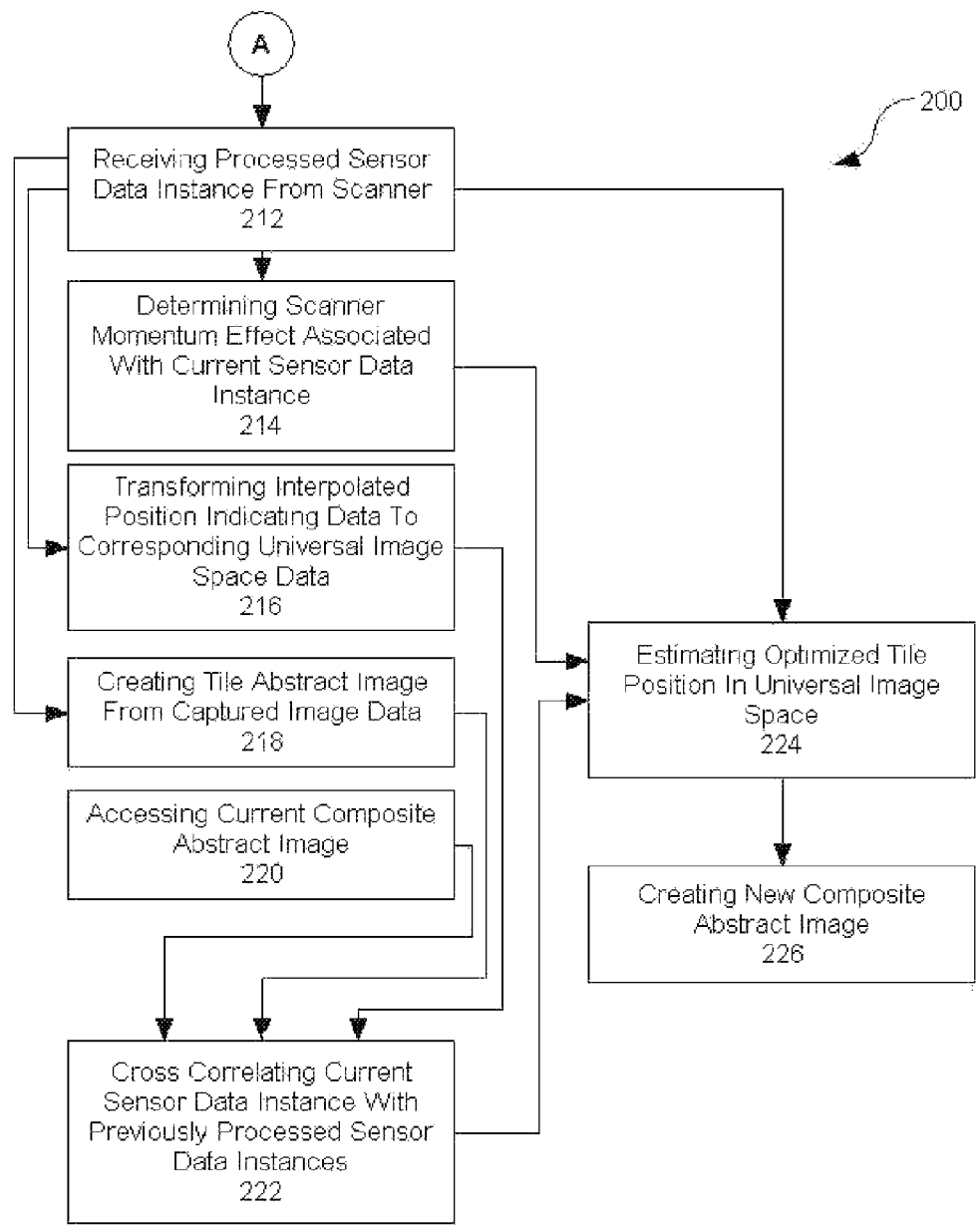

Referring now to FIGS. 10A and 10B, a method 200 for performing image processing functionality in accordance with an embodiment of the present invention will be discussed. Such image processing functionality enables output of one or more types of images derived from sensor data generated and configured in accordance with the present invention (e.g., position indicating data PID and the captured image data CID discussed above). An image outputted by the image processing instructions is a reconstruction of a scanned image from which the position indicating data and captured image data was generated by a scanner in accordance with the present invention (e.g., the scanner 12 discussed above).

At an operation 202, the method 200 provides for receiving a sensor data instance for a current point in time (i.e., a current sensor data instance). As discussed above, sensor data includes data from one or more sensors configured for providing position indicating data and data from one or more sensors configured for providing captured image data (e.g., a tile). It has been disclosed above that position indicating data in accordance with the present invention can include discrete data from each sensors of a positioning system, composite position indicating data derived from at least a portion of the sensors, or both. Examples of such position indicating data include, but are not limited to, information defining a position of the scanner, information defining a velocity of the scanner, information defining an acceleration of the scanner, and the like. Preferably, but not necessarily, the position indicating data of the sensor data instance can include discrete data from a plurality of interferometers.

After the sensor data instance is recorded, an operation 204 is performed for normalizing the position indication comprised by the current sensor data instance. The underlying objective of performing such normalizing is to adjust the position indicating data to compensate for known errors and non-linearities, thereby providing a consistent output for a given amount of scanner displacement. For example, interferometers are known to report different position deltas for the same distance if the unit is moving relatively fast versus moving relatively slow. Thus, it is preferred to normalize position deltas of interferometers. In one embodiment, normalizing the current sensor data instance includes apply coordinate correction and bias to position indicating data of the sensor data.

An operation 206 is performed for determining if the normalized position indicating data of the current sensor data instance is valid after normalizing the position indicating data of the current sensor data instance. Validity of position indicating data can be determined by assessing various different scenarios. In one scenario, if the lift bit indicates that sensor is too far from the surface, then the data position data from that sensor is not representative of the actual movement of the unit and can be deemed to be invalid. In another scenario, if position sensors data indicates that there is no motion and the other sensors indicate reasonable motion, then it can be assumed that the sensor corresponding to such non-movement has malfunctioned and, thus, position indication data corresponding to such malfunctioning sensor can be deemed invalid. In still another scenario, if position indicating data indicates that there is maximum constant velocity, then it can be assumed that the sensor corresponding to such maximum constant velocity is likely in a runaway condition and the data from such sensor is not usable and can, thus, be deemed invalid. In still another scenario, position indicating data from all position indicating data sensors is compared to each other and to the physical geometry (i.e., mounted position) of the sensors. A degree of validity (i.e., a confidence) of each sensor's output can be determined by this comparison.

In the case where the normalized position indicating data of the current sensor data instance is determined to the invalid, the current iteration of the method 200 ends. In the case where the normalized position indicating data of the current sensor data instance is determined to be valid, the method 200 continues at an operation 208 for determining an interpolated position of the scanner at the point in time where captured image data of the sensor data is generated. The interpolated position is defined by position indicating data corresponding to the point in time where captured image data of the sensor data is generated (i.e., interpolated position indication data). Thus, creation time information such as timestamps can be used for determining the interpolated position.

One reason such interpolation can be necessary is due to clock initialization offset. As discussed above in reference to FIG. 9, clock initialization offset occurs when separate clocks (e.g., those running at the same frequency or multiples of each other) are used for timing the generation of position indicating data instances and captured image data instances and such clocks are started in an offset manner such that their timing output indicators (e.g., ticks) are out of synchronization with each other. In general, generation of a captured image data instance takes longer to generate than generation of a position indicating data instance due to differential in time required for generating a captured image data instance with components of an imaging system of a scanner configured in accordance with the present invention and time required for generating a position indicating data instance with components of a position indicating system of a scanner configured in accordance with the present invention. As such, a clock controlling generation of captured image data will generally run at a fraction of the speed of a clock controlling generation of position indicating data. As such, it is necessary to interpolate a position of the scanner when a particular captured image data instance was generated.

Generation of a particular captured image data instance can correspond to the time at which generation of the particular captured image data instance was initiated or can correspond to the time at which a specified amount of such generation is completed (e.g., 50% of the image capture process time duration for a tile is elapsed). Accordingly, another reason that such interpolation can be necessary relates to specification of a point in time of the image capture process where the position of the scanner needs to be known (i.e., position indicating data instance corresponding to the point in time). For example, if it is determined that the most useful captured image is centered around 50% of the image capture process time duration for a tile being elapsed from when such processing was initiated, it will be advantageous to determine interpolated position indicating data corresponding to that elapse time from when the image capture process was initiated (e.g., when a clock cycle indicated that such image capture process should begin).

After the interpolated position indicating data is determined, an operation 210 is performed for transmitting the processed sensor data instance (i.e., captured image data and interpolated position indicating data) from the scanner (i.e., a first scanner system apparatus) for reception by a scanner software application (i.e., a second scanner system apparatus), followed by the scanner software application performing an operation 212 for receiving the processed sensor data instance. The scanner software application 14 discussed above is one example of such a scanner software application. Thus, in the depicted embodiment, the scanner (e.g., sensor data processing instructions thereof) and the scanner software application are jointly configured for providing image processing functionality in accordance with the present invention. In other embodiments, it is disclosed herein that such image processing functionality can be performed entirely by the scanner or entirely by the scanner software application. A skilled person will appreciate that, when the image processing functionality is performed entirely by the scanner or entirely by the scanner software application, the operations for normalizing the position indicating data and/or the operation for determining the interpolated position indicating data can be performed at different locations within a method for performing image processing functionality in accordance with the present invention. For example, the interpolated position indication data can be generated by a scanner software application running on a computer to which the scanner sends as-generated (e.g., unprocessed) position indicating data.

Thereafter, as shown in FIG. 10B, the sensor data instance is used in carrying out various operations. The interpolated position indicating data of the sensor data instance can be used by an operation 214 for determining a momentum effect of the scanner at a point in time when the sensor data instance was generated. The interpolated position indicating data of sensor data instance can be used by an operation 216 for transforming such interpolated position indicating position data to corresponding universal image space position data.

The captured image data of the sensor data instance can be used by an operation 218 for creating an abstract tile image.

By determining the momentum effect of the scanner at the time the sensor data image was created, the momentum effect and/or information derived therefrom can be used in predicting the next position of the scanner (e.g., the position at which the current sensor data instance was generated) and/or verifying the position of the captured image data of the sensor data instance with respect to captured image data of other sensor data instances. Determining the momentum effect can include extrapolating a momentum effect of the scanner from position indicating data (e.g., translational and rotational orientation) of previously processed sensor data instances and using such momentum effect to verify and/or approximate position indicating data for the current sensor data instance. In essence, momentum associated with movement of the scanner provides an estimate of a position to where the unit could move. Thus, the momentum effect can be used to predicted location/orientation of the scanner based on its momentum (e.g., the peak of the probability distribution of possible locations/orientations).

Determining the momentum effect can include weighting the momentum effect based on a degree of confidence in the accuracy/relevance of the determined momentum effect. It is disclosed herein that a confidence factor can be applied to a determined momentum effect value for establishing a confidence weighted momentum effect. Examples of parameters upon which a confidence factor in accordance with the present invention can be derived include, but are not limited to, the accuracy of measurements made by sensors generating the position indicating data, how reasonable the position indicating data appears, the relative physical geometry of the various sensors, specifications of the device, upper/lower limits on what is considered to be valid position indicating data, a requirement that the position indicating data should not conflict with the physical relationship of the sensor locations or other parameters.

Universal image space is a spatial area that represents a displayed representation of a scanned object and/or a printed presentation of the scanned object. Universal image space can be defined from coordinates of a first image tile of a scanned image. For example, such coordinates of the first image tile can be the center of the first image tile with the first image tile defining an non-rotated orientation with respect to X, Y, and Z axes thereof. Transforming the interpolated position indicating data to corresponding universal image space position data includes determining where in a spatial area that captured image data corresponding to the interpolated position indicating data is positioned (e.g., translational position (X-Y axes) and rotational position (Z-axis)). Such determination is derived, at least in part, by creating a combined position estimate based on the position indicating data associated with a plurality of position indicating data sensors. For example, in the case where position indicating data for a given tile is generated for each one of a plurality of interferometers, the position indicating data from all of the interferometers is used in deriving a combined estimate of the position (translational and rotational positions) of the tile.

Furthermore, transforming the interpolated position indicating data can include correcting the interpolated position indicating data for sensor drift. Sensor drift refers to discrepancies between relative physical location of the position indicating data sensors (e.g., relative location with respect to each other) and a computed position of the position indicating data sensors as derived using the interpolated position indication data of each one of the position indicating data sensors. The underlying intent of accounting for sensor drift is to minimize error between the physical sensor locations and position indicating data provided by such sensors. Based on the physical geometry of the scanner sensor and the confidences of the position indication data (i.e., scanner-generated position measurements), position indicating data of each respective sensor can be adjusted to a best estimate derived in view of the sensor drift. The sensor drift can also be used for specifying a new baseline value or calibration of the sensor positions during generation of a subsequent sensor data instance, thereby allow deviation of position indicating sensors from their physical geometry positions and computed positions to be determined.

Creating an abstract tile image entails creating an image derived from captured image data for the current sensor data instance. Advantageously, the abstract tile image provides distinct features of an image to which other tiles can be aligned. For example, well-defined edges that are accentuated by the elimination/reduction of less pronounced features and high-frequency noise serve as preferred features of a scanned image upon which a particular tile (i.e., captured image data instance) can be aligned to an adjacent tile. Aligning a plurality of abstract images within the universal image space results in the creation of a composite abstract image.

In many ways the abstract image is similar to an illustrative rendering of a photograph. Just as an illustration distills essential elements of a photograph, the abstract image is intended to distill the real image into a form that is possible for a scanner software application configured in a accordance with the present invention to cross correlate on. The abstract image is an expedient to make it easier computationally and more precise to find relation between a tile image and one or more previous tile images. To this end, it is advantageous for an appearance (i.e., format) of the abstract image to be customized for enabling such cross correlation. A software application configured in accordance with the present invention uses a direct mathematical cross-correlation of two images and tests the offset hypothesis with a limited set of probe offsets. If every possible offset of a tile image is tried (i.e., evaluated for relative positioning/fit)during such cross correlation, this would provide for a complete cross-correlation of captured image data but at the expense of lengthy processing time. All pixels in the overlapping region between the current tile and the previous tile or merged tiles is usually used in the cross correlation. However, to be efficient a limited number of alignments are tried to determine the best alignment. If the alignments tried are spaced by more than one pixel apart at the resolution used for cross correlation, the actual peak location indicating the best alignment is determined by a parabolic curve fit. This sparse alignment tries are possible because the abstract image was constructed to produce a smooth correlation surface correlate (i.e., statistically a high peak that falls off from the peak with uniformly sloping shoulders). It is efficient and advantageous to use sparse alignment tries for the cross correlation calculations.

The ideal profile of the cross-correlation image is attained with images that consist of sharp step functions as sharp edges. Thus, it is desirable to abstract a real image (i.e., a tile image) into an abstract image that has sharp edges across boundaries, but without ragged noise between. This is in fact the characteristic of a median filtered image. A median filter removes short impulses that would give a ragged terrain to the cross-correlation image, but it preserves the sharpness of edges that give a sharp peak to the cross-correlation with smooth and uniform slopes on each side, making it easy to find the peak with a small number of probe points. Furthermore, a median is a form of averaging where extreme points do not count more than non-extreme points. The median value is defined as that value here half the samples are larger and half the samples are smaller. It doesn't matter if a larger sample is slightly larger or millions of times larger, it casts a simple "larger" vote. In a two- dimensional image (e.g., a tile image), a median average removes small dots completely, but it does preserve the profile and sharpness of edges.

Still referring to FIG. 10B, in conjunction with an operation 220 being performed for accessing a current composite abstract image, an operation 222 is performed for cross correlating the current sensor data instance with previously processed sensor data instances. The underlying purpose of such cross correlation is to provide an accurate translational and rotational position of a current tile relative to the translational and rotational position of other image tiles of previously processed sensor data instances. Accordingly, cross correlation determines alignment correction (translation and rotational correction) needed to align a tile with one or more previous tiles. In one embodiment of such cross correlation, a current tile's interpolated position indicating data and/or the corresponding combined position estimate is used for correlating the position of the tile with tiles corresponding to previously processed sensor data instances. For example, the current tile's position indicating data and/or combined position estimate is used to compare image data (e.g., raw captured image data and/or abstract tile image data abstract) of the current tile with image data of previously processed sensor data instances. The cross correlation in translation and rotational orientation with previous tiles provides an additional measurement of a tile's actual position and orientation in relationship to tiles of previously processed sensor data instances.

It is disclosed herein that position indicating data provided by position indicating sensors and an abstract images can be used for performing cross correlation in accordance with the present invention. In such an embodiment, the position indicating data is used for providing a general reference location of an image tile. However, because position indicating data can offer less than required and/or desired accuracy, captured image data can be used to accomplish a more accurate cross correlation alignment. In particular, after the position indicating data is used for determining a relative position between two overlapping image tiles, abstract images of the two image tiles can be used for aligning such two image tiles with a greater degree of accuracy. For example, common features of such abstract images (e.g., edges of the abstract image) can be aligned. Preferably, the captured image data will have higher resolution of accuracy that data provided by the position indicating sensors and, thus, the resulting alignment from the abstract images will offer a greater degree of accuracy that if such alignment relied solely on the position indicating data.

Thereafter, an operation 224 is performed for estimating an optimized position in universal space for the tile corresponding to the captured image data of the current sensor data instance. The underlying objective of estimating the optimized position of the tile (e.g., its translational position and rotational position) in universal image space is to provide a best estimate of the current tile's translational position and rotational orientation in the universal image space. To this end, estimating an optimized position for a tile can include combining image correlation results with transformed sensor data (e.g., transformed position indicating data, abstract tile image, etc) to determine the best estimate of tiles' position. Position indicating data (i.e., sensor measurements), absolute and/or weighted scanner effect, and/or cross correlation results are examples of position optimization information that can be used for estimating an optimized tile position. Furthermore, confidence factors can be derived for and applied to all of some of the position optimization information.

An operation 226 is preformed for creating a new composite abstract image after estimating the optimized position in universal image space for the tile. The new composite abstract image includes the tile corresponding to the current sensor data instance. As disclosed above, the abstract tile image provides distinct features of an image to which other tiles can be aligned. As such, creating the new composite abstract image includes using such distinct features to aligning the tile of the current sensor data instance to a plurality of other abstract images that have already been aligned within the universal image space.

Figure 11:
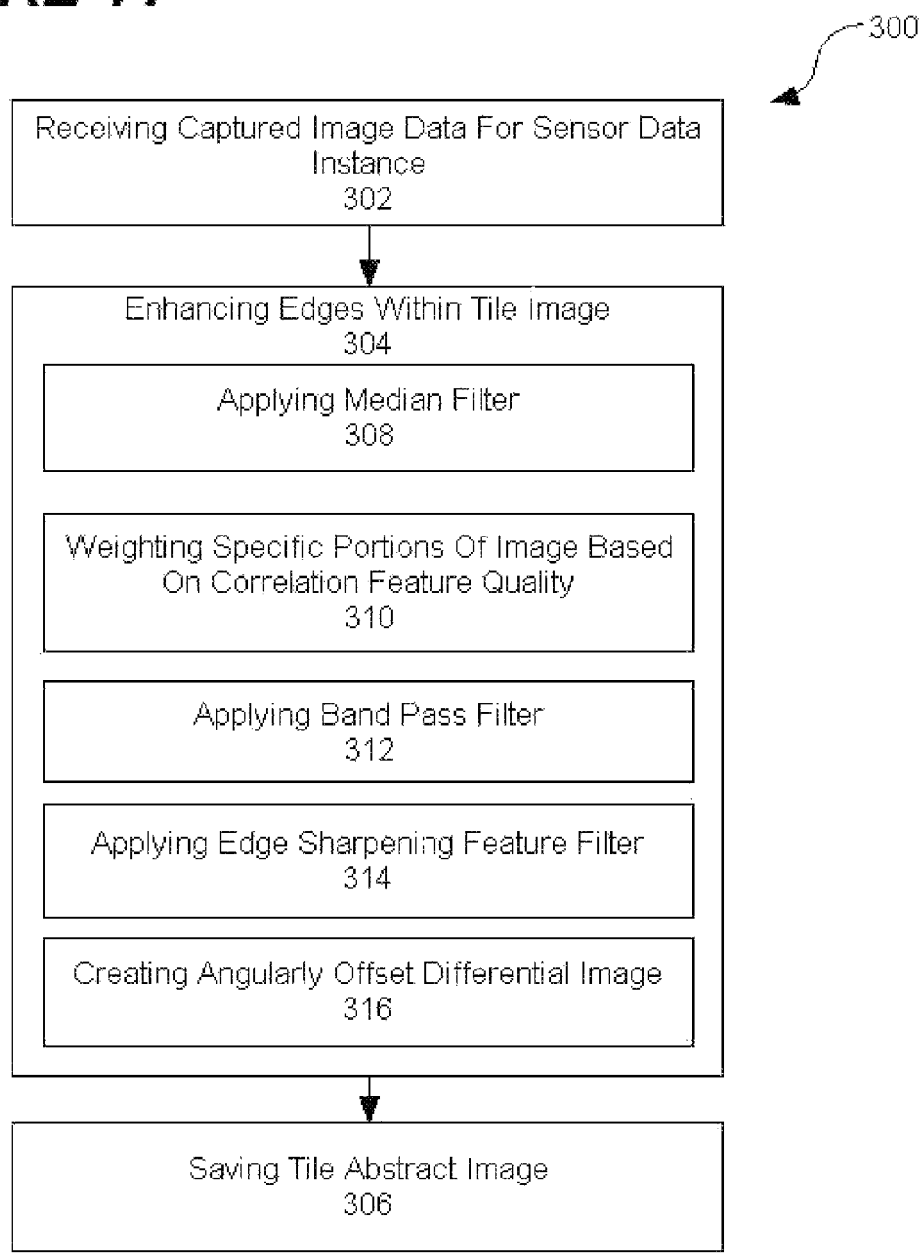
FIG. 11 is a flow diagram showing a method for creating an abstract tile image in accordance with an embodiment of the present invention.

FIG. 11 shows an embodiment of a method 300 for creating an abstract tile image. As has been disclosed above, creating an abstract tile image entails creating an image derived from captured image data for the current sensor data instance. The abstract tile image provides distinct features of a tile image to which distinct features of other tile images can be aligned. For example, well-defined edges that are accentuated by the elimination/reduction of less pronounced features and high-frequency noise serve as preferred features of a scanned visual content upon which a particular tile (i.e., captured image data instance) can be aligned to an adjacent tile.

At an operation 302, the method 300 provides for receiving captured image data of a sensor data instance currently being processed (i.e., the currently processed sensor data instance). The captured image data is embodied as a tile having a portion of scanned visual content of a scannable object provided thereon (i.e., a tile image). After receiving the captured image data, an operation 304 is performed for enhancing edges of the tile image thereby creating an edge-enhanced abstract tile image. Thereafter, an operation 306 is performed for saving the edge-enhanced abstract tile image.

In one embodiment, creating the edge-enhanced tile image can include subjecting the captured image data and/or derivatives thereof to one or more tile processing steps. One example of such a tile processing steps includes a step 308 for determining relevant high frequency information by applying a median filter to a tile image (e.g., an unprocessed tile image or an abstract tile image). The median filter can be configured for eliminating noise while preserving strong edges. Another example of such a tile processing steps includes a step 310 for weighting specific portions of a tile image (e.g., an unprocessed tile image or an abstract tile image) based on correlation feature quality. In effect, a weighting filter is applied to a tile image for identifying portions of the tile image whose content will be preferentially enhanced and those that will be preferentially diminished. Another example of such a tile processing steps includes a step 312 for applying a bandpass filter to a tile image. The bandpass filter can be configured to remove high frequency noise and low frequency mottling. Low frequency mottling is known to adversely impact correlation functionality particularly in view of shading affects near edge of a tile image. Still another example of such a tile processing steps includes a step 314 for applying a sharpening filter to a tile image. The sharpening filter can be configured for enhancing definition of edge features. Still further, another example of such a tile processing steps includes a step 316 for creating an angularly offset differential abstract tile image from an existing abstract tile image. The angularly offset differential abstract tile image can improve rotational correlation accuracy. To this end, creating the angularly offset differential abstract tile image can include rotating the existing abstract tile image by a small angle amount and subtracting the resulting rotated abstract tile image from the existing abstract tile image.

Figure 12A:
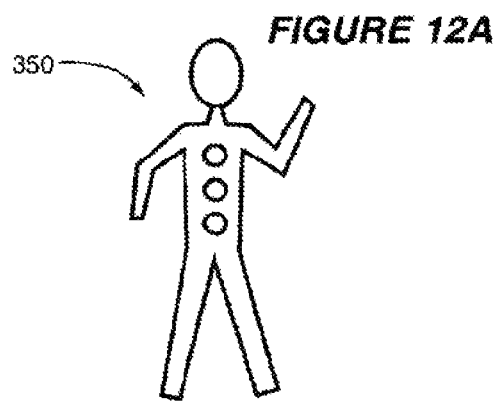
FIG. 12A is an illustrative view of a scanned image in accordance with an embodiment of the present invention.
Figure 12B:
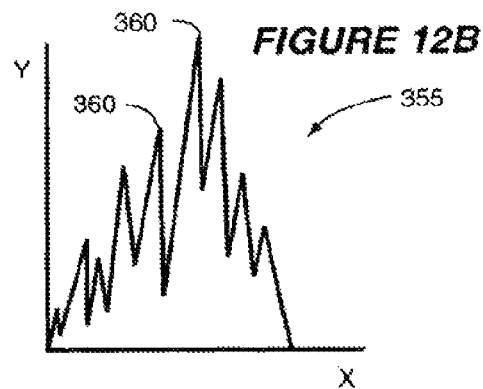
FIG. 12B is a graph of a distribution curve corresponding to correlatable features of the scanned image of FIG. 12A.

FIG. 12A shows an example of a tile image 350 scanned in accordance with the present invention. FIG. 12B shows a distribution curve 355 corresponding to correlatable features (e.g., edges defining areas) of the scanned image 350. As can be seen, there are several correlation peaks 360 of the distribution curve 355 on which to cross correlate. The correlation peaks 360 correspond to high contrast points in the vertical direction (i.e., in Y-direction) at a given horizontal position (i.e., along X-axis). However, in view of such distribution of the correlation peaks 360, it is possible to correlate the tile image 350 on a less than optimum or preferred correlation peak of the distribution curve 355.

Figure 13B:
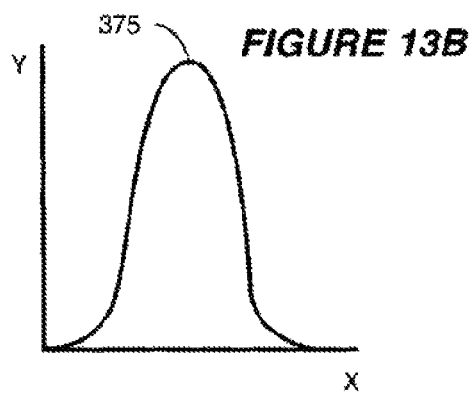
FIG. 13B is a graph of a distribution curve corresponding to correlatable features of the abstract tile image of FIG. 13A.
Figure 13A:
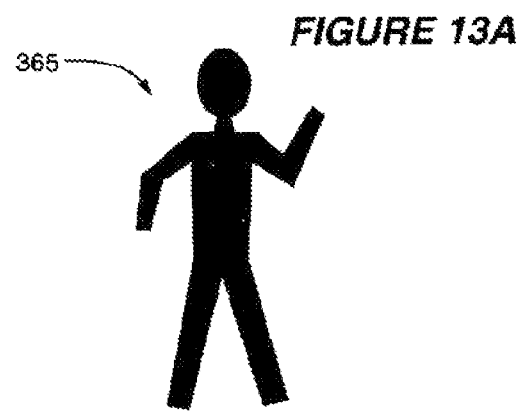
FIG. 13A is an illustrative view of an abstract tile image derived from the scanned image of FIG. 12A.

As shown in FIG. 13A, through tile processing using means such as one or more of those disclosed above in reference to steps 308-314, an abstract tile image 365 in accordance with the present invention can be derived. Through such processing, an abstraction of the tile image (i.e., abstract tile image 365) is created for providing more predictable and precise cross correlation. As can be seen, the distribution curve 370 corresponding to correlatable features (e.g., edges defining areas) provides for more efficient, effective, and precise cross correlation in view of a single correlation peak 375.

Figure 14:
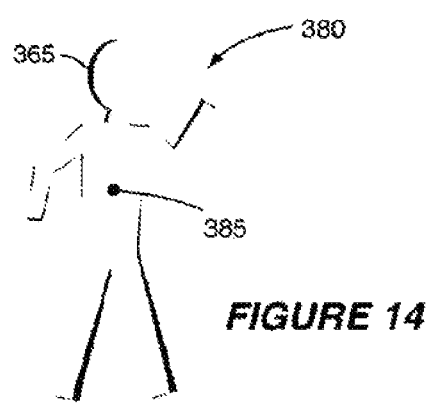
FIG. 14 is an illustrative view of an angularly offset differential abstract tile image derived from the abstract tile image of FIG. 13A.

Referring to FIG. 14, an angularly offset differential abstract tile image 380 derived from the abstract tile image 365 of FIG. 13A is shown. The angularly offset differential abstract tile image 380 is useful in determining angular rotation during cross correlation of two tile images. The angularly offset differential abstract tile image 380 is created by rotating a copy of the abstract tile image 365 by a small angle amount about a point of rotation 385 and subtracting the resulting rotated copy of the abstract image 365 from the original abstract tile image.

Figure 15:
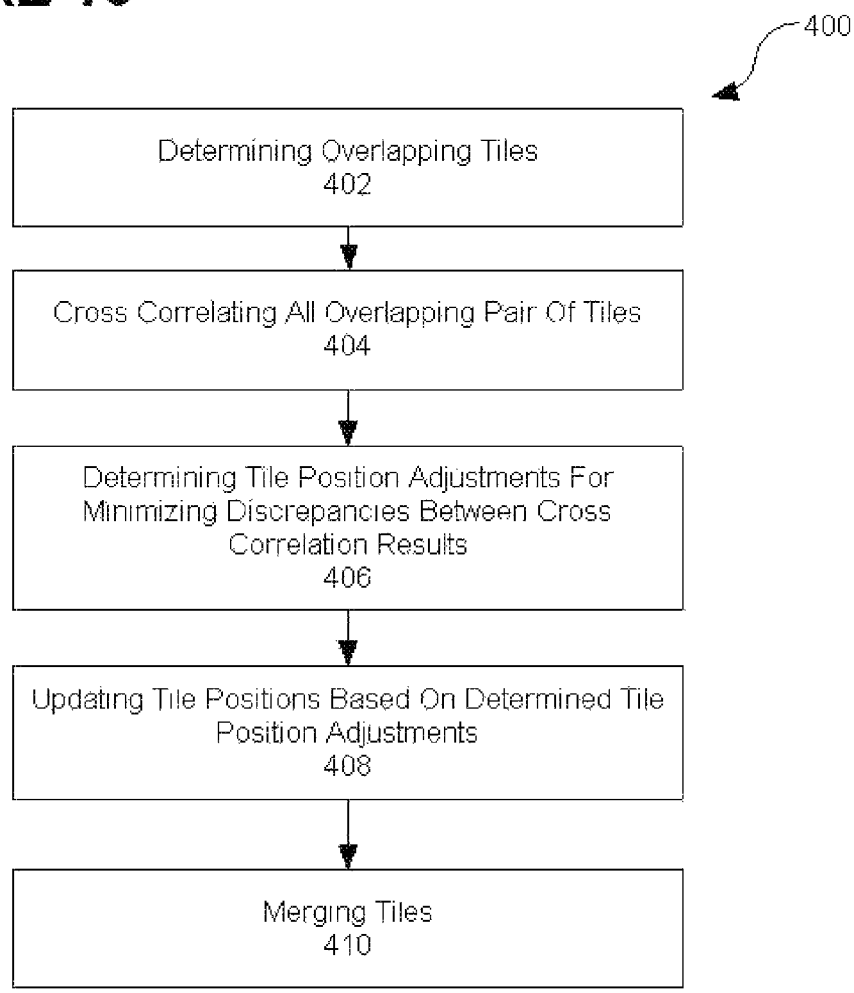
FIG. 15 is a flow diagram showing a method for re-tensioning tiles in accordance with an embodiment of the present invention.

FIG. 15 shows an embodiment of a method 400 for re-tensioning tiles of a composite abstract image. Retensioning tiles is performed for optimizing placement of tiles in a composite abstract image. Tiles within a re-tensioned composite abstract image are selected and optimized to minimize discrepancies in alignment between adjacent tiles. As such, the re-tensioned composite abstract image can be used for outputting a high-resolution image of scanned visual content from which the tiles are generated.

At an operation 402, the method 400 provides for determining potentially overlapping tiles. The objective in determining potentially overlapping tiles is to provide a collection of potentially overlapping tiles based on the best estimate of position and orientation. In one embodiment, such determination includes scan through tiles of the composite abstract image determining their positions and extents (e.g., overall spatial dimensions) and calculating percentage of overlap between tiles that are close enough in image space to possibly overlap. Next, an operation 404 is performed for cross correlating all overlapping pairs of tiles. Cross correlation ascertains cross correlation in both translation and rotation to determine translational and rotational correction needed to align to pairs of image tiles. The image cross correlation between two overlapping tiles determine the amount of translation or rotation that is needed to best align those two tiles. This amount of translation and rotation can be thought of as a tension between the two tiles. The cross correlation of a tile with all its the overlapping tiles creates a list of translations and rotations that if combined would produce a translation and rotation for that tile that would best align with all the overlapping tiles. It is disclosed herein that cross correlation of tile A with tile B can preclude needing to determine the cross correlation of tile B with tile A. After performing such cross correlation, an operation 406 is performed for determining tile position adjustment necessary for minimizing discrepancies between cross correlation results. The objective of determining such adjustments is to minimize mis-alignment (i.e., tension) between the tiles such that an overall average misalignment is minimized. In this manner, the misalignment tension between adjacent tiles is minimized. As each tile's position is adjusted, tension (i.e., misalignment) changes for overlapping tiles. A ripple affect occurs through all the tiles in the image as each tile's position and rotation are modified. In one embodiment, minimizing overall tension in a composite abstract image includes iteratively determining translational and rotational position of tiles and using the sum of the tensions and the change in the sum of the tensions to determine how many iterations were needed to settle on a desired solution. An operation 408 is performed for updating tile positions based on the determined tile position adjustments. After updating the tile positions, an operation 410 is performed for merging the tiles together into a high-resolution output image. Merge tiles includes each new tile being added to a composite image as a weighted sum.

In one embodiment, the need for merging image tiles arises from such image tiles being an RGB image of pixel values. Associated with each image is a weight mask that that has a "goodness" value for each pixel location. If the image is cropped by the housing of the unit, the part of the image containing the housing is no good for creating a composite image and is given a weight of zero. If glare from the LEDs, shading affects, or poor focus degrade part of the tile image, the weight mask is less than one. As each tile is added to the composite image, its pixel values are added in to the all the other images that have a pixel at that location in the universal (paper) space. The amount added from the new tile is proportional to the weight at that pixel location compared to the accumulated weight from all the previous tiles added to the composite image at that same pixel location. So if the new tile had a weight for pixel being added of 0.84 and that pixel location in paper space had an accumulated weight of 5.04, then 0.166 of the RGB pixel intensity of the current tile would be added to 0.833 of the previously accumulated pixel intensity. To accomplish this, the merged composite image has a corresponding merged composite accumulated weight image.

Figure 16:
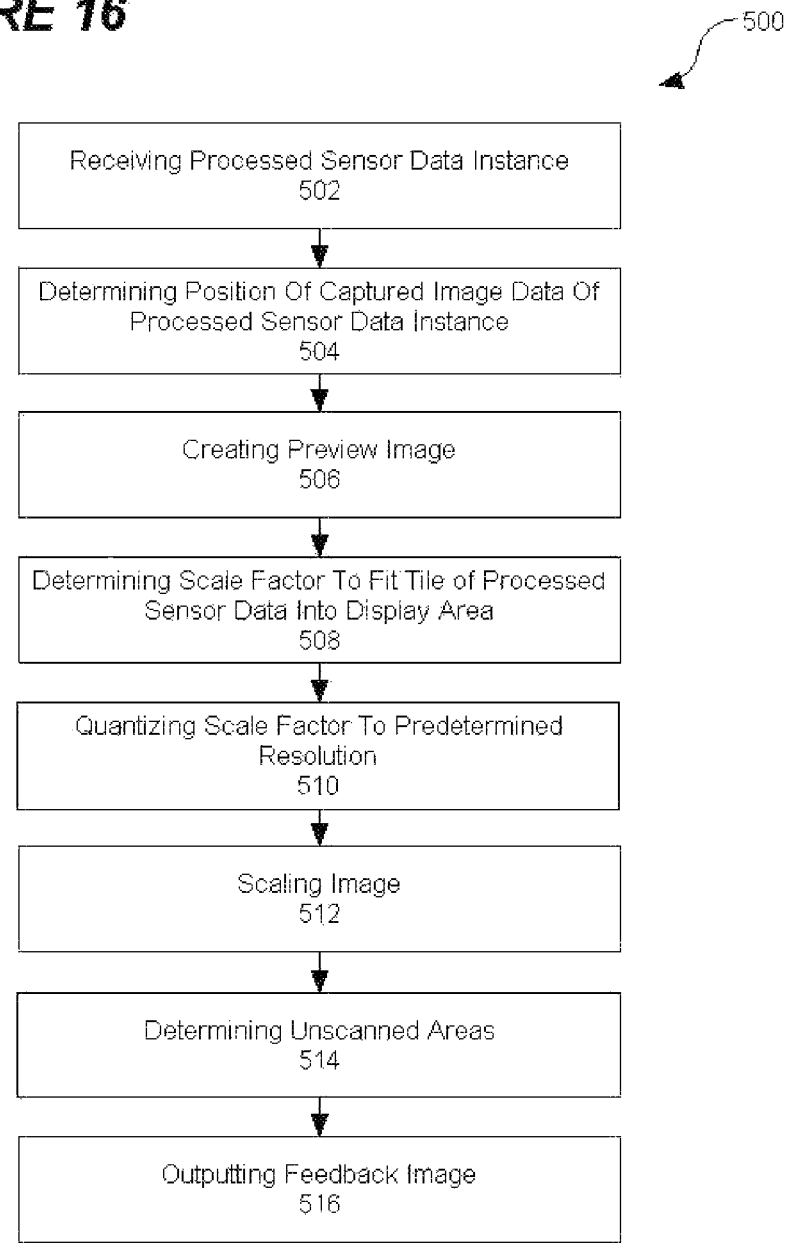
FIG. 16 is a flow diagram showing a method for creating a feedback image in accordance with an embodiment of the present invention.

FIG. 16 shows a method 500 for providing a feedback image in accordance with an embodiment of the present invention. It is disclosed herein that an area of a tile can be approximately the same as a scan area of the scanner that creates the tile. It is also disclosed herein that the physical dimensions of a handheld scanner define a scan area of a scanner configured in accordance with the present invention. As such, it is often the case that capturing all desired visual content of a scannable object required that the scanner be repeatedly swept across the scannable object until all desired visual content of the scannable object has been scanned. Advantageously, a feedback image configured in accordance with the present invention indicates areas of a scannable object that have been scanned and those that have not. For example, in one embodiment, the feedback image displays portions of the visual content that are being scanned in real-time or near real-time as they are being scanned. Thus, a user can use the feedback image as a guide to areas of the visual content that have yet to be scanned.

At an operation 502, the method 500 performs an operation for receiving a current sensor data instance. The current sensor data instance includes captured image data (i.e., a tile) and corresponding interpolated position indicating data. In one embodiment, the current sensor data instance is the processed sensor data instance produced in response to the operation

208 in FIG. 10A. After receiving the current sensor data instance, an operation 504 is performed for using the interpolated position indicating data to determine a position of the tile relative to other tiles already placed within universal image space of a feedback image, followed by an operation 506 being performed for creating a preview image having the tile positioned therein. Creation of the preview image refers to transforming the composite abstract image from universal image space to display space. Generally, the preview image is not displayed, but is used in creating an image that is displayed for viewing (e.g., the feedback image). An operation 508 is then performed for determining a scale factor to fit the tiles into a particular display area (e.g., an area designated for displaying the feedback image on a visual display of a computer). After determining the scale factor, an operation 510 is performed for quantizing the scale factor to a predetermined display resolution, followed by an operation 512 being performed for scaling the preview image. Quantizing the scale factor refers to rounding or correlating the determined scale factor to a closest one of a plurality of pre-defined scale factor, which advantageously can control the resizing of the as-displayed feedback image. Next, an operation 514 is performed for determining areas of the preview image for which there are no tiles positioned therein, followed by an operation for outputting a feedback image that includes visual indicators of unscanned areas and that includes shows visual content of tiles that have been generated. Because the feedback image is created concurrently with the visual content being scanned, visual content of newly scanned tiles is continuously being added to the feedback image and the area of the feedback image corresponding to unscanned portions of the visual content is continuously being populated with tiles during a scan session.

Referring now to instructions processible by a data processing device, it will be understood from the disclosures made herein that methods, processes and/or operations adapted for carrying out sensor data capture functionality and/or image processing functionality as disclosed herein are tangibly embodied by computer readable medium having instructions thereon that are configured for carrying out such functionality(ies). In one embodiment, the instructions are tangibly embodied for carrying out sensor data capture methodology as disclosed above in reference to FIGS. 6-8. In another embodiment, the instructions are tangibly embodied for carrying out image processing functionality in accordance with method 200 disclosed above.). In still another embodiment, the instructions are tangibly embodied for carrying out sensor data capture methodology as disclosed above in reference to FIGS. 6-8 and for carrying out image processing functionality in accordance with method 200 disclosed above. The instructions can be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with an embodiment of the present invention include a compact disk, a hard drive, RAM or other type of storage apparatus that has imaged thereon a computer program (i.e., instructions) adapted for carrying out sensor data capture functionality and/or image processing functionality in accordance with an embodiment of the present invention.

In the preceding detailed description, reference has been made to the accompanying drawings that form a part hereof, and in which are shown by way of illustration specific embodiments in which the present invention can be practiced. These embodiments, and certain variants thereof, have been described in sufficient detail to enable those skilled in the art to practice embodiments of the present invention. Throughout the description and claims of this specification the word "comprise," "includes," or variations of these words are not intended to exclude other additives, components, integers or steps. It is to be understood that other suitable embodiments can be utilized and that logical, mechanical, chemical and electrical changes can be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A non-transitory computer-readable medium having computer-executable instructions accessible therefrom, said computer-executable instructions configured for controlling at least one processor to perform a method of processing information generated by an image capture unit, said computer-executable instructions comprising operations for:
processing sensor data received from the image capture unit, wherein said sensor data includes a plurality of image tiles and position indicating data defining a relative position of a respective one of said image tiles, wherein at least a portion of said image tiles includes data representing a discrete portion of visual content;
displaying a feedback image derived using said data representing the discrete portion of said visual content of at least a portion of said image tiles, wherein displaying the feedback image includes displaying the discrete portion of said visual content of at least a portion of said image tiles in response to at least a portion of said image tiles being generated and wherein displaying the discrete portion of said visual content includes correlating the relative position of a particular one of said image tiles with at least one other image tile that has been previously generated and displayed.

2. The non-transitory computer-readable medium of claim 1 wherein processing said sensor data includes deriving from said position indicating data a position of the image capture unit at a point in time when generation of each one of said image tiles was one of initiated, completed, and partially completed.

3. The non-transitory computer-readable medium of claim 2 wherein deriving the position of the image capture unit includes interpolating the position of the image capture unit from at least one position indicating data instance generated prior to a point in time when generation of a respective instance of the data representing the discrete portion of said visual content was one of initiated, completed, and partially completed and at least one position indicating data instance generated after the point in time when generation of the respective instance of the data representing the discrete portion of said visual content was one of initiated, completed, and partially completed.

4. The non-transitory computer-readable medium of claim 1 wherein:
processing said sensor data includes receiving said sensor data from the image capture unit; and
displaying the feedback image includes determining a position of a most currently received one of said image tiles with respect to at least one previously received one of said image tiles.

5. The non-transitory computer-readable medium of claim 4 wherein determining a position of the most currently received one of said image tiles with respect to at least one previously received one of said image tiles includes cross correlating an abstract image of the most currently received one of said image tiles with an abstract image of at least one previously received one of said image tiles.

6. The non-transitory computer-readable medium of claim 4, further comprising:
in response to determining the position of the most currently received one of said image tiles, updating a preview image to include the most currently received one of said image tiles in its determined position with respect to previously received ones of said image tiles within the preview image; and
deriving the feedback image from the preview image after updating the preview image.

7. The non-transitory computer-readable medium of claim 6 wherein updating the preview image includes determining a ratio by which to scale the preview image for causing the feedback image to fit within a size of a visual display area in which the feedback image is to be displayed.

8. An image capture unit, comprising:
a visual display;
an image capturing sensor;
one or more positional sensors;
at least one processor coupled to the visual display, to the one or more positional sensors, and to the image capturing sensor;
at least one memory coupled to said at least one processor;
instructions accessible from said at least one memory by said at least one processor, wherein said instructions are configured for causing said at least one processor to:
process sensor data received from the image capturing sensor and from the one or more positional sensors, wherein said sensor data includes a plurality of image tiles and position indicating data, wherein the position indicating data defines a relative position of a respective one of said image tiles, wherein at least a portion of said image tiles include data representing a discrete portion of visual content;
display, on the visual display, a feedback image derived using at least a portion of said image tiles, wherein causing said at least one processor to display the feedback image includes causing said at least one processor to display at least a portion of said visual content in response to at least a portion of said image tiles being generated and wherein causing said at least one processor to display at least the portion of said visual content includes causing said at least one processor to correlate the relative position of a particular one of said image tiles with at least one other image tile that has been previously generated and displayed.

9. The image capture unit of claim 8 wherein causing said at least one processor to process said sensor data includes causing said at least one processor to derive from said position indicating data a position of the image capturing sensor at a point in time when generation of each one of said image tiles was one of initiated, completed, and partially completed.

10. The image capture unit of claim 9 wherein causing said at least one processor to derive the position of the image capturing sensor includes causing said at least one processor to interpolate the position of the image capturing sensor from at least one position indicating data instance generated prior to a point in time when generation of a respective instance of the data representing the discrete portion of said visual content was one of initiated, completed, and partially completed and at least one position indicating data instance generated after the point in time when generation of the respective instance of the data representing the discrete portion of said visual content was one of initiated, completed, and partially completed.

11. The image capture unit of claim 8 wherein:
causing said at least one processor to process said sensor data includes causing said at least one processor to receive said sensor data from the image capturing sensor; and
causing said at least one processor to display the feedback image includes causing said at least one processor to determine a position of a most currently received one of said image tiles with respect to at least one previously received one of said image tiles.

12. The image capture unit of claim 11, further comprising:
in response to causing said at least one processor to determine the position of the most currently received one of said image tiles, causing said at least one processor to update a preview image to include the most currently received one of said image tiles in its determined position with respect to previously received ones of said image tiles within the preview image; and
causing said at least one processor to derive the feedback image from the preview image after updating the preview image.

13. The image capture unit of claim 12 wherein causing said at least one processor to update the preview image includes causing said at least one processor to determine a ratio by which to scale the preview image for causing the feedback image to fit within a size of a visual display area of the visual display.

* * * * *